(12) United States Patent
Shyamkumar et al.

(10) Patent No.: US 10,572,703 B1
(45) Date of Patent: Feb. 25, 2020

(54) RFID-BASED ITEM PRESENCE DETECTION

(71) Applicant: Impinj, Inc., Seattle, WA (US)

(72) Inventors: Balaji Shyamkumar, Sammamish, WA (US); Kurt Sundstrom, Woodinville, WA (US); Scott Cooper, Seattle, WA (US); Jayasuryan Iyer, Bellevue, WA (US); Sandesh Doddameti, Seattle, WA (US); Christopher J. Diorio, Shoreline, WA (US)

(73) Assignee: Impinj, Inc., Seattle, WA (US)

( * ) Notice: Subject to any disclaimer, the term of this patent is extended or adjusted under 35 U.S.C. 154(b) by 25 days.

(21) Appl. No.: 15/959,601

(22) Filed: Apr. 23, 2018

Related U.S. Application Data

(63) Continuation-in-part of application No. 15/133,248, filed on Apr. 20, 2016, now Pat. No. 9,959,494.

(60) Provisional application No. 62/150,216, filed on Apr. 20, 2015.

(51) Int. Cl.
*G06K 7/10* (2006.01)
*H01Q 1/22* (2006.01)
*G06Q 10/08* (2012.01)

(52) U.S. Cl.
CPC ..... *G06K 7/10445* (2013.01); *G06K 7/10297* (2013.01); *G06K 7/10386* (2013.01); *G06Q 10/087* (2013.01); *H01Q 1/2216* (2013.01)

(58) Field of Classification Search
None
See application file for complete search history.

(56) References Cited

U.S. PATENT DOCUMENTS

| | | | |
|---|---|---|---|
| 2006/0193433 A1* | 8/2006 | Ledoux | G01N 23/223 378/57 |
| 2009/0146792 A1* | 6/2009 | Sadr | G06K 7/10188 340/10.3 |
| 2010/0134276 A1* | 6/2010 | Zaruba | G01S 5/0257 340/539.13 |
| 2014/0084060 A1 | 3/2014 | Jain et al. | |
| 2016/0379388 A1* | 12/2016 | Rasco | G06F 16/29 715/753 |

* cited by examiner

*Primary Examiner* — Daniell L Negron
(74) *Attorney, Agent, or Firm* — Hertzberg, Turk & Associates, LLC

(57) ABSTRACT

An RFID-based item tracking system may use statistical methods to determine whether a tag or tagged item that does not respond when inventoried is present in a particular zone or reader antenna field-of-view. In one embodiment, the item tracking system may determine an observability of an item based on one or more initial trials. Upon not detecting the item in one or more subsequent trials, the item tracking system may estimate whether the item is still present based on the observability.

20 Claims, 14 Drawing Sheets

RFID SYSTEM ARCHITECTURE

US 10,572,703 B1

RFID-BASED ITEM PRESENCE DETECTION

CROSS REFERENCE TO RELATED APPLICATIONS

This application is a continuation-in-part of U.S. patent application Ser. No. 15/133,248 filed on Apr. 20, 2016, which in turn claims the benefit of U.S. Provisional Patent Application Ser. No. 62/150,216 filed on Apr. 20, 2015. The disclosures of the above applications are hereby incorporated by reference for all purposes.

BACKGROUND

Radio-Frequency Identification (RFID) systems typically include RFID readers, also known as RFID reader/writers or RFID interrogators, and RFID tags. RFID systems can be used in many ways for locating and identifying objects to which the tags are attached. RFID systems are useful in product-related and service-related industries for tracking objects being processed, inventoried, or handled. In such cases, an RFID tag is usually attached to an individual item, or to its package.

In principle, RFID techniques entail using an RFID reader to inventory one or more RFID tags, where inventorying involves at least singulating a tag and receiving an identifier from the singulated tag. "Singulated" is defined as a reader singling-out one tag, potentially from among multiple tags, for a reader-tag dialog. "Identifier" is defined as a number identifying the tag or the item to which the tag is attached, such as a tag identifier (TID), electronic product code (EPC), a universal product code (UPC), a global trade identification number (GTIN), a serialized GTIN (SGTIN), a random number, or any other number or code that identifies a tag or associated item. The reader transmitting a Radio-Frequency (RF) wave performs the interrogation. The RF wave is typically electromagnetic, at least in the far field. The RF wave can also be predominantly electric or magnetic in the near or transitional near field. The RF wave may encode one or more commands that instruct the tags to perform one or more actions.

In typical RFID systems, an RFID reader transmits a modulated RF inventory signal (a command), receives a tag reply, and transmits an RF acknowledgement signal responsive to the tag reply. A tag that senses the interrogating RF wave may respond by transmitting back another RF wave. The tag either generates the transmitted back RF wave originally, or by reflecting back a portion of the interrogating RF wave in a process known as backscatter. Backscatter may take place in a number of ways.

The reflected-back RF wave may encode data stored in the tag, such as a number. The response is demodulated and decoded by the reader, which thereby identifies, counts, or otherwise interacts with the associated item. The decoded data can denote a serial number, a price, a date, a time, a destination, an encrypted message, an electronic signature, other attribute(s), any combination of attributes, and so on. Accordingly, when a reader receives tag data it can learn about the item that hosts the tag and/or about the tag itself.

An RFID tag typically includes an antenna section, a radio section, a power-management section, and frequently a logical section, a memory, or both. In some RFID tags the power-management section included an energy storage device such as a battery. RFID tags with an energy storage device are known as battery-assisted, semi-active, or active tags. Other RFID tags can be powered solely by the RF signal they receive. Such RFID tags do not include an energy storage device and are called passive tags. Of course, even passive tags typically include temporary energy- and data/flag-storage elements such as capacitors or inductors.

BRIEF SUMMARY

This summary is provided to introduce a selection of concepts in a simplified form that are further described below in the Detailed Description. This summary is not intended to identify key features or essential features of the claimed subject matter, nor is it intended as an aid in determining the scope of the claimed subject matter.

Embodiments are directed to determining item presence using RFID systems. An RFID-based item tracking system may use statistical methods to determine whether a tag or tagged item that does not respond when inventoried is present in a particular zone or reader antenna field-of-view. In one embodiment, the item tracking system may determine an observability of an item based on one or more initial trials. Upon not detecting the item in one or more subsequent trials, the item tracking system may use the observability to determine a presence probability of the item in the zone.

These and other features and advantages will be apparent from a reading of the following detailed description and a review of the associated drawings. It is to be understood that both the foregoing general description and the following detailed description are explanatory only and are not restrictive of aspects as claimed.

BRIEF DESCRIPTION OF THE DRAWINGS

The following Detailed Description proceeds with reference to the accompanying drawings, in which.

DETAILED DESCRIPTION

In the following detailed description, references are made to the accompanying drawings that form a part hereof, and in which are shown by way of illustration specific embodiments or examples. These embodiments or examples may be combined, other aspects may be utilized, and structural changes may be made without departing from the spirit or scope of the present disclosure. The following detailed description is therefore not to be taken in a limiting sense, and the scope of the present invention is defined by the appended claims and their equivalents.

As used herein, "memory" is one of ROM, RAM, SRAM, DRAM, NVM, EEPROM, FLASH, Fuse, MRAM, FRAM, and other similar volatile and nonvolatile information-storage technologies as will be known to those skilled in the art. Some portions of memory may be writeable and some not. "Command" refers to a reader request for one or more tags to perform one or more actions, and includes one or more tag instructions preceded by a command identifier or command code that identifies the command and/or the tag instructions. "Instruction" refers to a request to a tag to perform a single explicit action (e.g., write data into memory). "Program" refers to a request to a tag to perform a set or sequence of instructions (e.g., read a value from memory and, if the read value is less than a threshold then lock a memory word). "Protocol" refers to an industry standard for communications between a reader and a tag (and vice versa), such as the Class-1 Generation-2 UHF RFID Protocol for Communications at 860 MHz-960 MHz by GS1 EPCglobal, Inc. ("Gen2 Specification"), versions 1.2.0 and 2.0 of which are hereby incorporated by reference.

Figure 1:
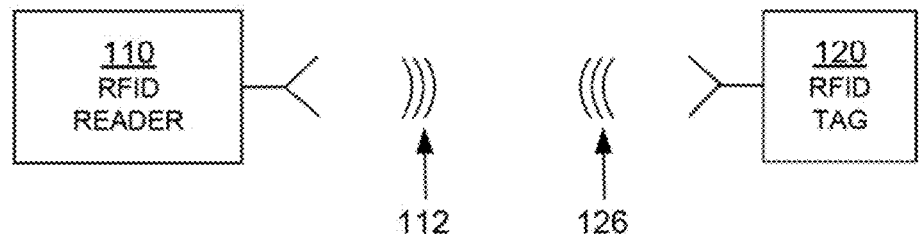
FIG. 1 is a block diagram of components of an RFID system.

FIG. 1 is a diagram of the components of a typical RFID system 100, incorporating embodiments. An RFID reader 110 transmits an interrogating RF signal 112. RFID tag 120 in the vicinity of RFID reader 110 senses interrogating RF signal 112 and generates signal 126 in response. RFID reader 110 senses and interprets signal 126. The signals 112 and 126 may include RF waves and/or non-propagating RF signals (e.g., reactive near-field signals).

Reader 110 and tag 120 communicate via signals 112 and 126. When communicating, each encodes, modulates, and transmits data to the other, and each receives, demodulates, and decodes data from the other. The data can be modulated onto, and demodulated from, RF waveforms. The RF waveforms are typically in a suitable range of frequencies, such as those near 900 MHz, 13.56 MHz, and so on.

The communication between reader and tag uses symbols, also called RFID symbols. A symbol can be a delimiter, a calibration value, and so on. Symbols can be implemented for exchanging binary data, such as "0" and "1", if that is desired. When symbols are processed by reader 110 and tag 120 they can be treated as values, numbers, and so on.

Tag 120 can be a passive tag, or an active or battery-assisted tag (i.e., a tag having its own power source). When tag 120 is a passive tag, it is powered from signal 112.

Figure 2:
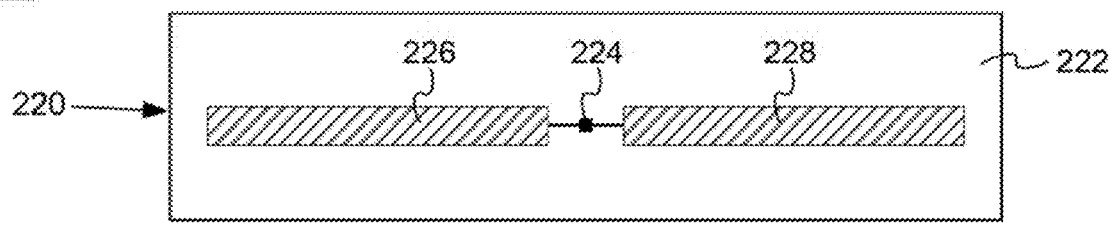
FIG. 2 is a diagram showing components of a passive RFID tag, such as a tag that can be used in the system of FIG. 1.
Figure 2:
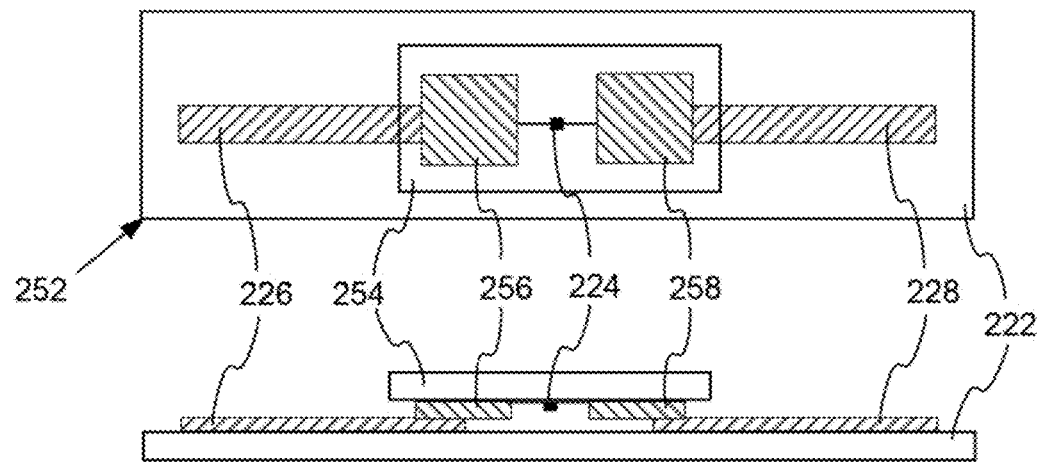
Figure 2:
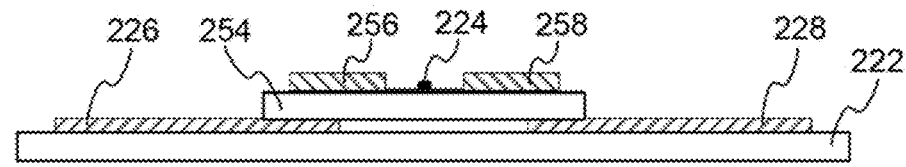

FIG. 2 is a diagram of an RFID tag 220, which may function as tag 120 of FIG. 1. Tag 220 is drawn as a passive tag, meaning it does not have its own power source. Much of what is described in this document, however, applies also to active and battery-assisted tags.

Tag 220 is typically (although not necessarily) formed on a substantially planar inlay 222, which can be made in many ways known in the art. Tag 220 includes a circuit which may be implemented as an IC 224. In some embodiments IC 224 is implemented in complementary metal-oxide semiconductor (CMOS) technology. In other embodiments IC 224 may be implemented in other technologies such as bipolar junction transistor (BJT) technology, metal-semiconductor field-effect transistor (MESFET) technology, and others as will be well known to those skilled in the art. IC 224 is arranged on inlay 222.

Tag 220 also includes an antenna for exchanging wireless signals with its environment. The antenna is often flat and attached to inlay 222. IC 224 is electrically coupled to the antenna via suitable IC contacts (not shown in FIG. 2). The term "electrically coupled" as used herein may mean a direct electrical connection, or it may mean a connection that includes one or more intervening circuit blocks, elements, or devices. The "electrical" part of the term "electrically coupled" as used in this document shall mean a coupling that is one or more of ohmic/galvanic, capacitive, and/or inductive. Similarly, the terms "electrically isolated" or "electrically decoupled" as used herein mean that electrical coupling of one or more types (e.g., galvanic, capacitive, and/or inductive) is not present, at least to the extent possible. For example, elements that are electrically isolated from each other are galvanically isolated from each other, capacitively isolated from each other, and/or inductively isolated from each other. Of course, electrically isolated components will generally have some unavoidable stray capacitive or inductive coupling between them, but the intent of the isolation is to minimize this stray coupling to a negligible level when compared with an electrically coupled path.

IC 224 is shown with a single antenna port, comprising two IC contacts electrically coupled to two antenna segments 226 and 228 which are shown here forming a dipole. Many other embodiments are possible using any number of ports, contacts, antennas, and/or antenna segments.

Diagram 250 depicts top and side views of tag 252, formed using a strap. Tag 252 differs from tag 220 in that it includes a substantially planar strap substrate 254 having strap contacts 256 and 258. IC 224 is mounted on strap substrate 254 such that the IC contacts on IC 224 electrically couple to strap contacts 256 and 258 via suitable connections (not shown). Strap substrate 254 is then placed on inlay 222 such that strap contacts 256 and 258 electrically couple to antenna segments 226 and 228. Strap substrate 254 may be affixed to inlay 222 via pressing, an interface layer, one or more adhesives, or any other suitable means.

Diagram 260 depicts a side view of an alternative way to place strap substrate 254 onto inlay 222. Instead of strap substrate 254's surface, including strap contacts 256/258, facing the surface of inlay 222, strap substrate 254 is placed with its strap contacts 256/258 facing away from the surface of inlay 222. Strap contacts 256/258 can then be either capacitively coupled to antenna segments 226/228 through strap substrate 254, or conductively coupled using a through-via which may be formed by crimping strap contacts 256/258 to antenna segments 226/228. In some embodiments the positions of strap substrate 254 and inlay 222 may be reversed, with strap substrate 254 mounted beneath inlay 222 and strap contacts 256/258 electrically coupled to antenna segments 226/228 through inlay 222. Of course, in yet other embodiments strap contacts 256/258 may electrically couple to antenna segments 226/228 through both inlay 222 and strap substrate 254.

In operation, the antenna receives a signal and communicates it to IC 224, which may both harvest power and respond if appropriate, based on the incoming signal and the IC's internal state. If IC 224 uses backscatter modulation then it responds by modulating the antenna's reflectance, which in generates response signal 126 from signal 112 transmitted by the reader. Electrically coupling and uncoupling the IC contacts of IC 224 can modulate the antenna's reflectance, as can varying the admittance of a shunt-connected circuit element which is coupled to the IC contacts. Varying the impedance of a series-connected circuit element is another means of modulating the antenna's reflectance. If IC 224 is capable of transmitting signals (e.g., has its own power source, is coupled to an external power source, and/or is able to harvest sufficient power to transmit signals), then IC 224 may respond by transmitting response signal 126.

In the embodiments of FIG. 2, antenna segments 226 and 228 are separate from IC 224. In other embodiments, the antenna segments may alternatively be formed on IC 224. Tag antennas according to embodiments may be designed in any form and are not limited to dipoles. For example, the tag antenna may be a patch, a slot, a loop, a coil, a horn, a spiral, a monopole, microstrip, stripline, or any other suitable antenna.

An RFID tag such as tag 220 is often attached to or associated with an individual item or the item packaging. An RFID tag may be fabricated and then attached to the item or packaging, or may be partly fabricated before attachment to the item or packaging and then completely fabricated upon attachment to the item or packaging. In some embodiments, the manufacturing process of the item or packaging may include the fabrication of an RFID tag. In these embodiments, the resulting RFID tag may be integrated into the item or packaging, and portions of the item or packaging may serve as tag components. For example, conductive item or packaging portions may serve as tag antenna segments or contacts. Nonconductive item or packaging portions may serve as tag substrates or inlays. If the item or packaging includes integrated circuits or other circuitry, some portion of the circuitry may be configured to operate as part or all of an RFID tag IC. An "RFID IC" may refer to an item capable of receiving and responding to RFID signals. For example, an item having a separate but attached RFID tag can be considered an RFID IC, as is an item having an integrated RFID tag or an item manufactured to have the capabilities of an RFID tag. A standalone RFID tag may also be referred to as an "RFID IC".

The components of the RFID system of FIG. 1 may communicate with each other in any number of modes. One such mode is called full duplex, where both reader 110 and tag 120 can transmit at the same time. In some embodiments, RFID system 100 may be capable of full duplex communication if tag 120 is configured to transmit signals as described above. Another such mode, suitable for passive tags, is called half-duplex, and is described below.

Figure 3:
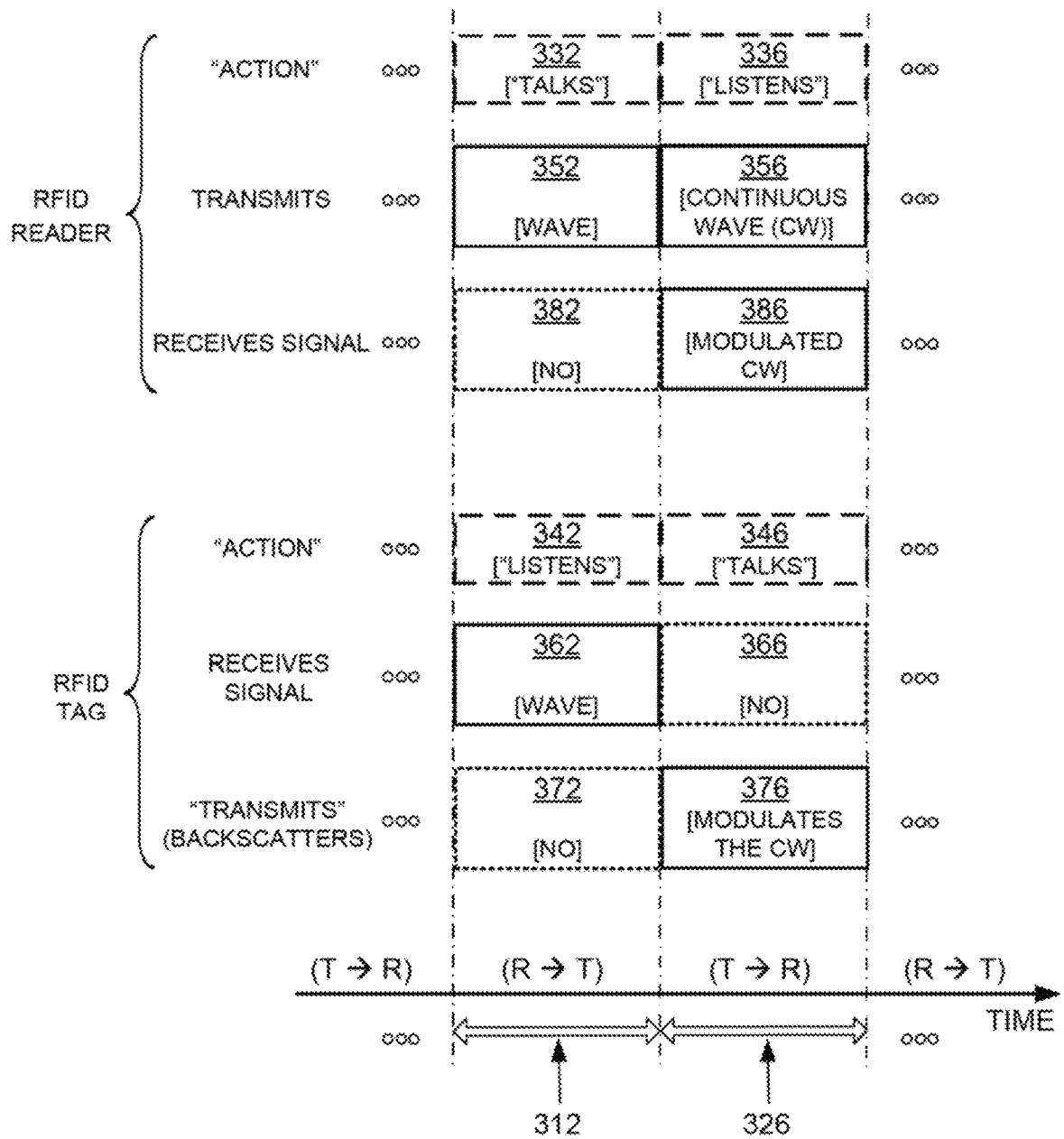
FIG. 3 is a conceptual diagram for explaining a half-duplex mode of communication between the components of the RFID system of FIG. 1.

FIG. 3 is a conceptual diagram 300 for explaining half-duplex communications between the components of the RFID system of FIG. 1, in this case with tag 120 implemented as passive tag 220 of FIG. 2. The explanation is made with reference to a TIME axis, and also to a human metaphor of "talking" and "listening". The actual technical implementations for "talking" and "listening" are now described.

RFID reader 110 and RFID tag 120 talk and listen to each other by taking turns. As seen on axis TIME, when reader 110 talks to tag 120 the communication session is designated as "R→T", and when tag 120 talks to reader 110 the communication session is designated as "T→R". Along the TIME axis, a sample R→T communication session occurs during a time interval 312, and a following sample T→R communication session occurs during a time interval 326. Interval 312 may be of a different duration than interval 326—here the durations are shown approximately equal only for purposes of illustration.

According to blocks 332 and 336, RFID reader 110 talks during interval 312, and listens during interval 326. According to blocks 342 and 346, RFID tag 120 listens while reader 110 talks (during interval 312), and talks while reader 110 listens (during interval 326).

In terms of actual behavior, during interval 312 reader 110 talks to tag 120 as follows. According to block 352, reader 110 transmits signal 112, which was first described in FIG. 1. At the same time, according to block 362, tag 120 receives signal 112 and processes it to extract data and so on. Meanwhile, according to block 372, tag 120 does not backscatter with its antenna, and according to block 382, reader 110 has no signal to receive from tag 120.

During interval 326, which may also be referred to as a backscatter time interval or backscatter interval, tag 120 talks to reader 110 as follows. According to block 356, reader 110 transmits a Continuous Wave (CW) signal, which can be thought of as a carrier that typically encodes no information. This CW signal serves both to transfer energy to tag 120 for its own internal power needs, and also as a carrier that tag 120 can modulate with its backscatter. Indeed, during interval 326, according to block 366, tag 120 does not receive a signal for processing. Instead, according to block 376, tag 120 modulates the CW emitted according to block 356 so as to generate backscatter signal 126, for example by adjusting its antenna reflectance. Concurrently, according to block 386, reader 110 receives backscatter signal 126 and processes it.

Figure 4:
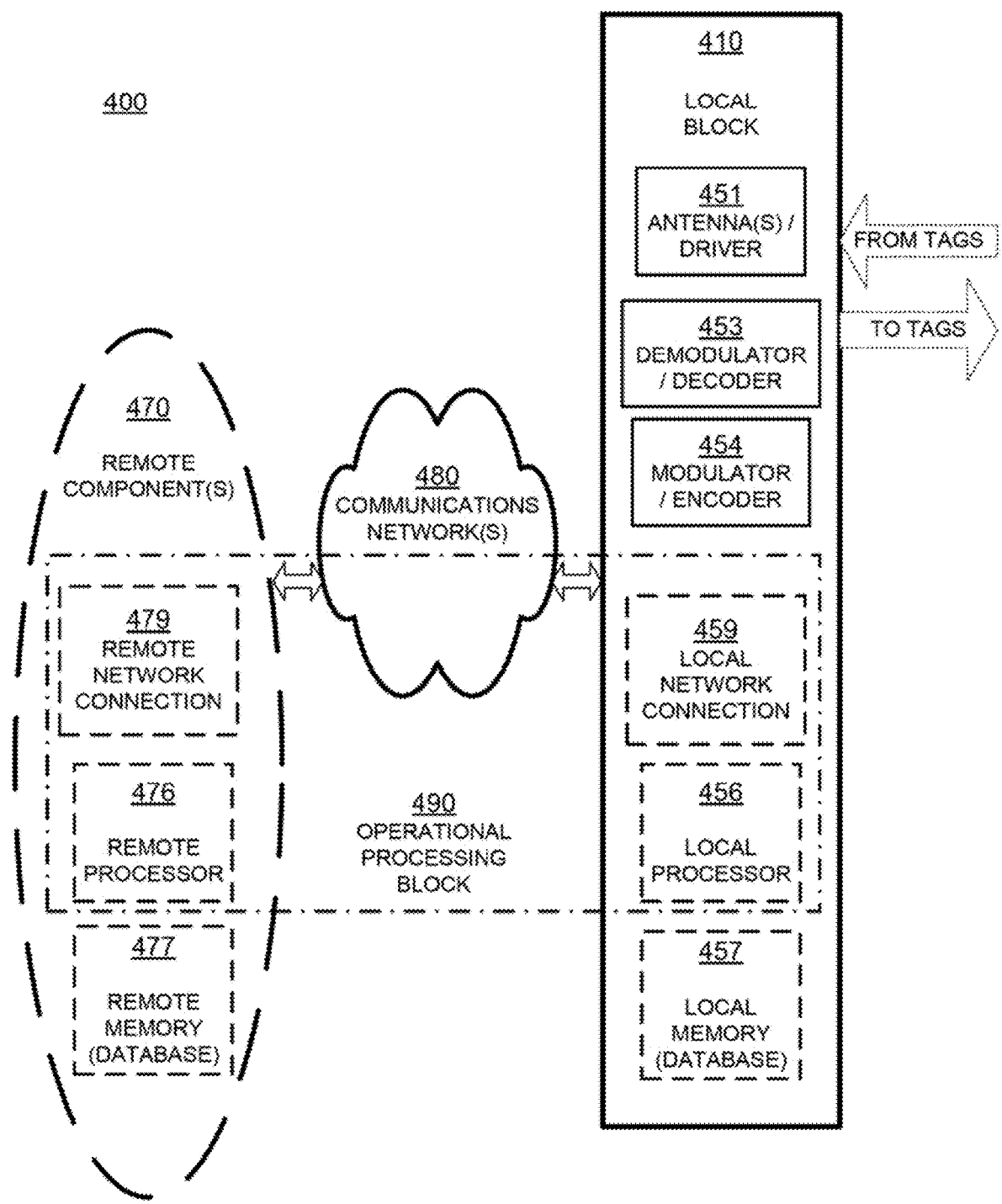
FIG. 4 is a block diagram showing a detail of an RFID reader system, such as the one shown in FIG. 1.

FIG. 4 is a block diagram of an RFID reader system 400 according to embodiments. RFID reader system 400 includes a local block 410, and optionally remote components 470. Local block 410 and remote components 470 can be implemented in any number of ways. It will be recognized that RFID reader 110 of FIG. 1 is the same as local block 410, if remote components 470 are not provided. Alternately, RFID reader 110 can be implemented instead by RFID reader system 400, of which only the local block 410 is shown in FIG. 1.

In some embodiments, one or more of the blocks or components of reader system 400 may be implemented as integrated circuits. For example, local block 410, one or more of the components of local block 410, and/or one or more of the remote components 470 may be implemented as integrated circuits using CMOS technology, BJT technology, MESFET technology, and/or any other suitable implementation technology.

Local block 410 is responsible for communicating with RFID tags. Local block 410 includes a block 451 of an antenna and a driver of the antenna for communicating with the tags. Some readers, like that shown in local block 410, contain a single antenna and driver. Some readers contain multiple antennas and drivers and a method to switch signals among them, including sometimes using different antennas for transmitting and for receiving. Some readers contain multiple antennas and drivers that can operate simultaneously. In some embodiments, block 451 may be a phased-array antenna or synthesized-beam antenna (SBA), and local block 410 may be implemented in a synthesized-beam reader (SBR) configured to generate one or more beams via the SBA. A demodulator/decoder block 453 demodulates and decodes backscattered waves received from the tags via antenna/driver block 451. Modulator/encoder block 454 encodes and modulates an RF wave that is to be transmitted to the tags via antenna/driver block 451.

Local block 410 additionally includes an optional local processor 456. Local processor 456 may be implemented in any number of ways known in the art. Such ways include, by way of examples and not of limitation, digital and/or analog processors such as microprocessors and digital-signal processors (DSPs); controllers such as microcontrollers; software running in a machine such as a general purpose computer; programmable circuits such as Field Programmable Gate Arrays (FPGAs), Field-Programmable Analog Arrays (FPAAs), Programmable Logic Devices (PLDs), Application Specific Integrated Circuits (ASIC), any combination of one or more of these; and so on. In some cases, some or all of the decoding function in block 453, the encoding function in block 454, or both, may be performed instead by local processor 456. In some cases, local processor 456 may implement an encryption or authentication function; in some cases one or more of these functions can be distributed among other blocks such as encoding block 454, or may be entirely incorporated in another block.

Local block 410 additionally includes an optional local memory 457. Local memory 457 may be implemented in any number of ways known in the art, including, by way of example and not of limitation, any of the memory types described above as well as any combination thereof. Local memory 457 can be implemented separately from local processor 456, or in an IC with local processor 456, with or without other components. Local memory 457, if provided, can store programs for local processor 456 to run, if needed.

In some embodiments, local memory 457 stores data read from tags, or data to be written to tags, such as Electronic Product Codes (EPCs), Tag Identifiers (TIDs) and other data. Local memory 457 can also include reference data that is to be compared to EPCs, instructions and/or rules for how to encode commands for the tags, modes for controlling antenna 451, secret keys, key pairs, and so on. In some of these embodiments, local memory 457 is provided as a database.

Some components of local block 410 typically treat the data as analog, such as the antenna/driver block 451. Other components such as local memory 457 typically treat the data as digital. At some point there is a conversion between analog and digital. Based on where this conversion occurs, a reader may be characterized as "analog" or "digital", but most readers contain a mix of analog and digital functionality.

If remote components 470 are provided, they are coupled to local block 410 via an electronic communications network 480. Network 480 can be a Local Area Network (LAN), a Metropolitan Area Network (MAN), a Wide Area Network (WAN), a network of networks such as the internet, or a local communication link, such as a USB, PCI, and so on. Local block 410 may include a local network connection 459 for communicating with communications network 480 or may couple to a separate device or component configured to communicate with communications network 480. Communications on the network can be secure, such as if they are encrypted or physically protected, or insecure if they are not encrypted or otherwise protected.

There can be one or more remote component(s) 470. If more than one, they can be located at the same location, or in different locations. They may communicate with each other and local block 410 via communications network 480, or via other similar networks, and so on. Accordingly, remote component(s) 470 can use respective remote network connections. Only one such remote network connection 479 is shown, which is similar to local network connection 459, etc. In some embodiments, a single one of the remote component(s) 470 may be configured to communicate with and/or control multiple local blocks, each similar to local block 610.

Remote component(s) 470 can also include a remote processor 476. Remote processor 476 can be made in any way known in the art, such as was described with reference to local processor 456. Remote processor 476 may also implement an authentication function, similar to local processor 456.

Remote component(s) 470 can also include a remote memory 477. Remote memory 477 can be made in any way known in the art, such as was described with reference to local memory 457. Remote memory 477 may include a local database, and a different database of a standards organization, such as one that can reference EPCs. Remote memory 477 may also contain information associated with commands, tag profiles, keys, or the like, similar to local memory 457.

Of the above-described elements, it may be useful to consider a combination of these components, designated as operational processing block 490. Operational processing block 490 includes those components that are provided of the following: local processor 456, remote processor 476, local network connection 459, remote network connection 479, and by extension an applicable portion of communications network 480 that links remote network connection 479 with local network connection 459. The portion can be dynamically changeable, etc. In addition, operational processing block 490 can receive and decode RF waves received via antenna/driver 451, and cause antenna/driver 451 to transmit RF waves according to what it has processed.

Operational processing block 490 includes either local processor 456, or remote processor 476, or both. If both are provided, remote processor 476 can be made such that it operates in a way complementary with that of local processor 456. In fact, the two can cooperate. It will be appreciated that operational processing block 490, as defined this way, is in communication with both local memory 457 and remote memory 477, if both are present.

Accordingly, operational processing block 490 is location independent, in that its functions can be implemented either by local processor 456, or by remote processor 476, or by a combination of both. Some of these functions are preferably implemented by local processor 456, and some by remote processor 476. Operational processing block 490 accesses local memory 457, or remote memory 477, or both for storing and/or retrieving data.

RFID reader system 400 operates by operational processing block 490 generating communications for RFID tags. These communications are ultimately transmitted by antenna/driver block 451, with modulator/encoder block 454 encoding and modulating the information on an RF wave. Then data is received from the tags via antenna/driver block 451, demodulated and decoded by demodulator/decoder block 453, and processed by operational processing block 490.

Embodiments of an RFID reader system can be implemented as hardware, software, firmware, or any combination. Such a system may be subdivided into components or modules. Some of these components or modules can be implemented as hardware, some as software, some as firmware, and some as a combination. An example of such a subdivision is now described, together with the RFID tag as an additional module.

Figure 5:
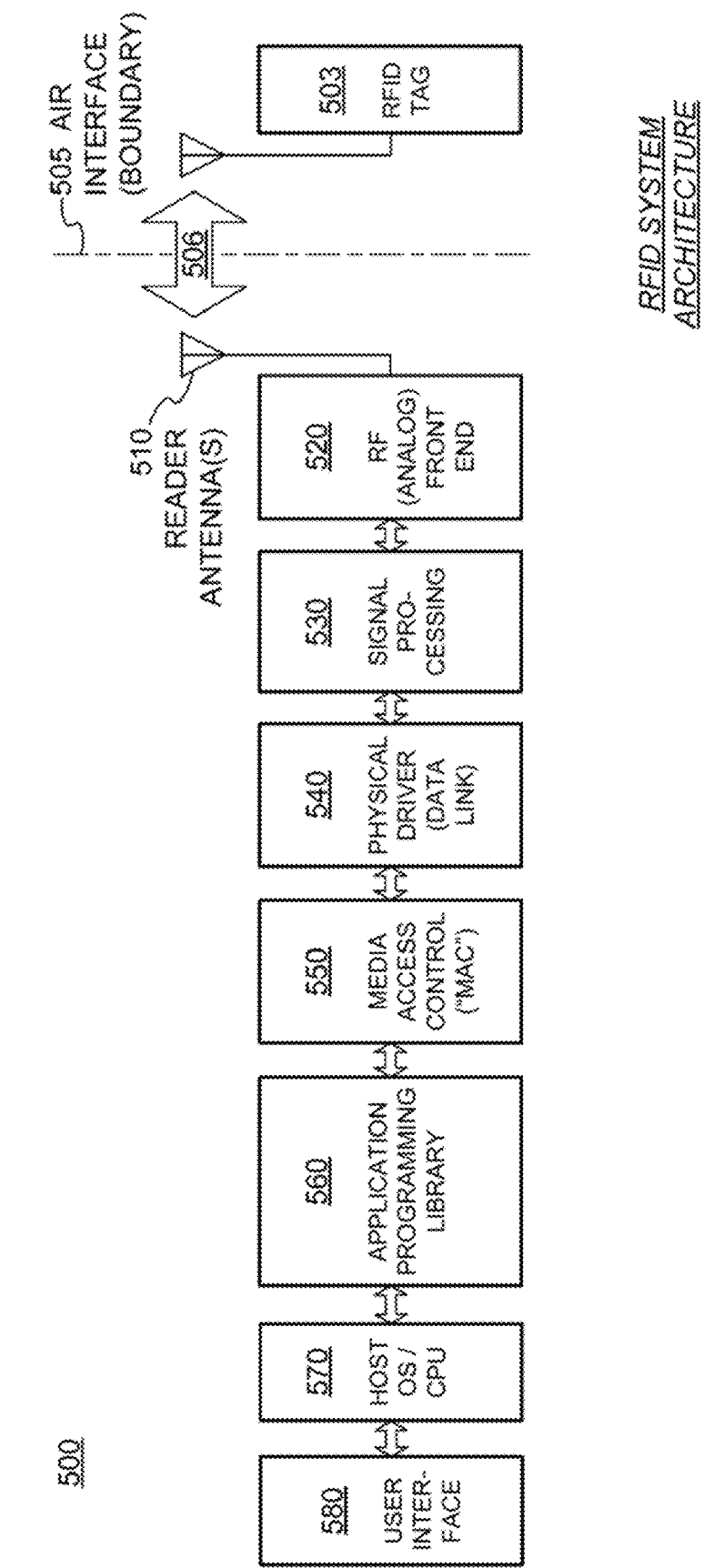
FIG. 5 is a block diagram illustrating an overall architecture of an RFID system according to embodiments.

FIG. 5 is a block diagram illustrating an overall architecture of an RFID system 500 according to embodiments. RFID system 500 may be subdivided into modules or components, each of which may be implemented by itself or in combination with others. In addition, some of them may be present more than once. Other embodiments may be equivalently subdivided into different modules. Some aspects of FIG. 5 are parallel with systems, modules, and components described previously.

An RFID tag 503 is considered here as a module by itself. RFID tag 503 conducts a wireless communication 506 with the remainder, via the air interface 505. Air interface 505 is really a boundary, in that signals or data that pass through it are not intended to be transformed from one thing to another. Specifications as to how readers and tags are to communicate with each other, for example the Gen2 Specification, also properly characterize that boundary as an interface.

RFID system 500 includes one or more reader antennas 510, and an RF front-end module 520 for interfacing with reader antenna(s) 510. These can be made as described above.

RFID system 500 also includes a signal-processing module 530. In one embodiment, signal-processing module 530 exchanges waveforms with RF front-end module 520, such as I and Q waveform pairs.

RFID system 500 also includes a physical-driver module 540, which is also known as a data-link module. In some embodiments physical-driver module 540 exchanges bits with signal-processing module 530. Physical-driver module 540 can be the stage associated with the framing of data.

RFID system 500 additionally includes a media access control module 550. In one embodiment, media access control layer module 550 exchanges packets of bits with physical driver module 540. Media access control layer module 550 can make decisions for sharing the medium of wireless communication, which in this case is the air interface.

RFID system 500 moreover includes an application-programming library-module 560. This module 560 can include application programming interfaces (APIs), other objects, etc.

All of these RFID system functionalities can be supported by one or more processors. One of these processors can be considered a host processor. Such a host processor might include a host operating system (OS) and/or central processing unit (CPU), as in module 570. In some embodiments, the processor is not considered as a separate module, but one that includes some of the above-mentioned modules of RFID system 500. In some embodiments the one or more processors may perform operations associated with retrieving data that may include a tag public key, an electronic signature, a tag identifier, an item identifier, and/or a signing-authority public key. In some embodiments the one or more processors may verify an electronic signature, create a tag challenge, and/or verify a tag response.

User interface module 580 may be coupled to application-programming-library module 560, for accessing the APIs. User interface module 580 can be manual, automatic, or both. It can be supported by the host OS/CPU module 570 mentioned above, or by a separate processor, etc.

It will be observed that the modules of RFID system 500 form a chain. Adjacent modules in the chain can be coupled by appropriate instrumentalities for exchanging signals. These instrumentalities include conductors, buses, interfaces, and so on. These instrumentalities can be local, e.g. to connect modules that are physically close to each other, or over a network, for remote communication.

The chain is used in one direction for receiving RFID waveforms and in the other direction for transmitting RFID waveforms. In receiving mode, reader antenna(s) 510 receives wireless waves, which are in turn processed successively by the various modules in the chain. Processing can terminate in any one of the modules. In transmitting mode, waveform initiation can be in any one of the modules. Ultimately, signals are routed to reader antenna(s) 510 to be transmitted as wireless waves.

The architecture of RFID system 500 is presented for purposes of explanation, and not of limitation. Its particular, subdivision into modules need not be followed for creating embodiments. Furthermore, the features of the present disclosure can be performed either within a single one of the modules, or by a combination of them. In some embodiments, RFID system 500 can be incorporated into another electronic device such as a checkout terminal in a store or a consumer device such as a mobile phone.

Figure 6:
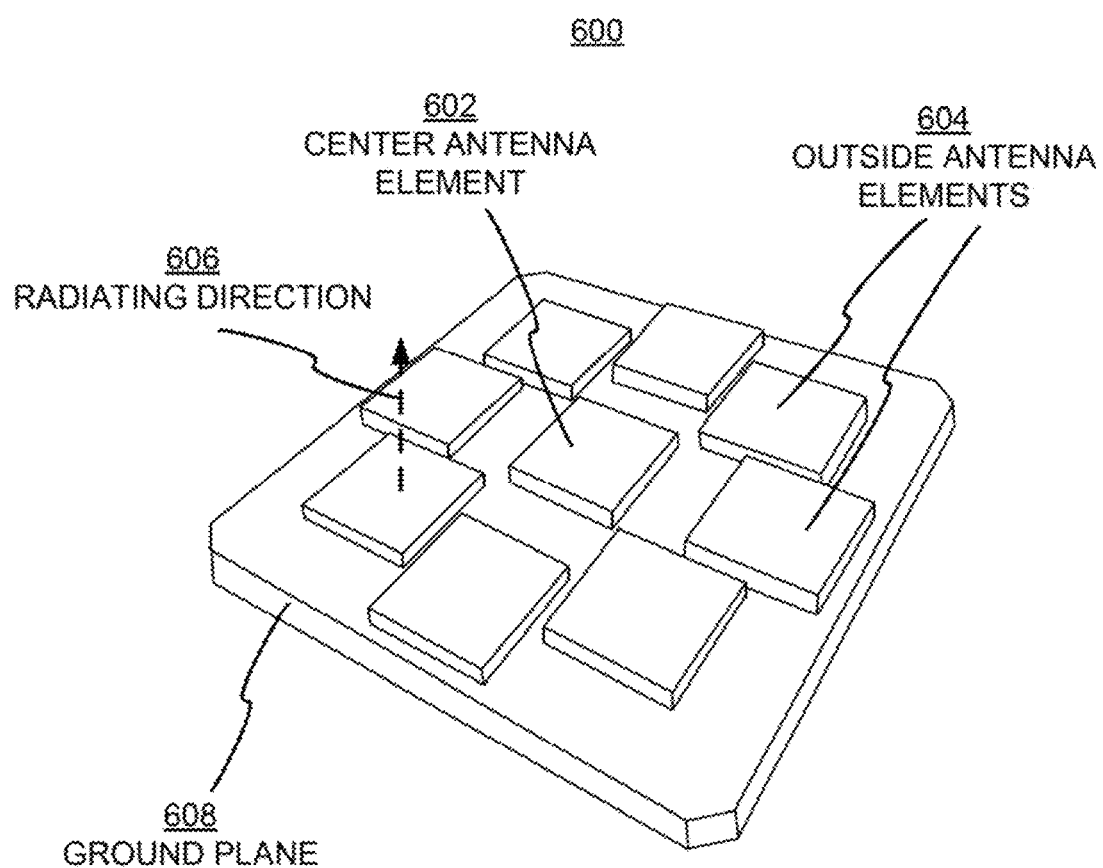
FIG. 6 depicts a discrete-element antenna array according to embodiments.

In some embodiments, one or more RFID readers, or distributed portions of one or more readers, may be coupled to or embedded within an antenna array to form a synthesized-beam reader (SBR) capable of generating multiple RF beams. FIG. 6 depicts a perspective view of an antenna array 600 with discrete radiating elements according to embodiments. Antenna array 600 includes an array of antenna elements 602 and 604, and a ground plane 608 behind elements 602 and 604. Each element has a radiating direction vector 606 (only shown for one element) that is typically, but not necessarily, perpendicular to the ground plane. An RF radiation pattern (or "beam") for receiving or transmitting an RF signal may be synthesized by adjusting the amplitude and/or phase of the signals coupled from/to each antenna element 602 and 604. The direction of the synthesized beam (typically represented by the direction of the beam's primary lobe—the lobe having the highest radiated power) is controlled by these various amplitude and/or phase adjustments. The adjustments may be analog, digital, or a mix of analog and digital. For example, during transmission, an SBR may generate the signal to be transmitted and then direct the generated signal to elements 602 and 604 with different amplitudes and phases. Alternatively, the SBR may synthesize the different signals for each antenna element digitally and then convert the digital signals to analog. For example, each antenna element can be implemented as a separate digital transceiver having its own analog front end. Control signals to generate a beam can then be supplied to the different digital transceivers, each of which converts a digital signal into an analog signal for transmission. When the digital transceivers transmit their analog signals, the signals combine to form the synthesized beam. In other embodiments the SBR may use a mix of these approaches. Similarly, during a receive operation the SBR may combine analog signals after appropriate phase shifting and amplitude adjustment of each, or it may digitize the signals from each element and combine them digitally, or a mix thereof.

The antenna elements of SBA 600 may be one or more of patch, slot, wire, horn, helical, distributed, or any other type as will be known to those skilled in the art. Whereas FIG. 6 only shows nine antenna elements, antenna arrays with any number of antenna elements may be used, including a single distributed element or an element made from metamaterials. In some embodiments ground plane 608 may be nonplanar (e.g., curved, concave, convex, etc.) and in other embodiments need not exist.

Figure 7A:
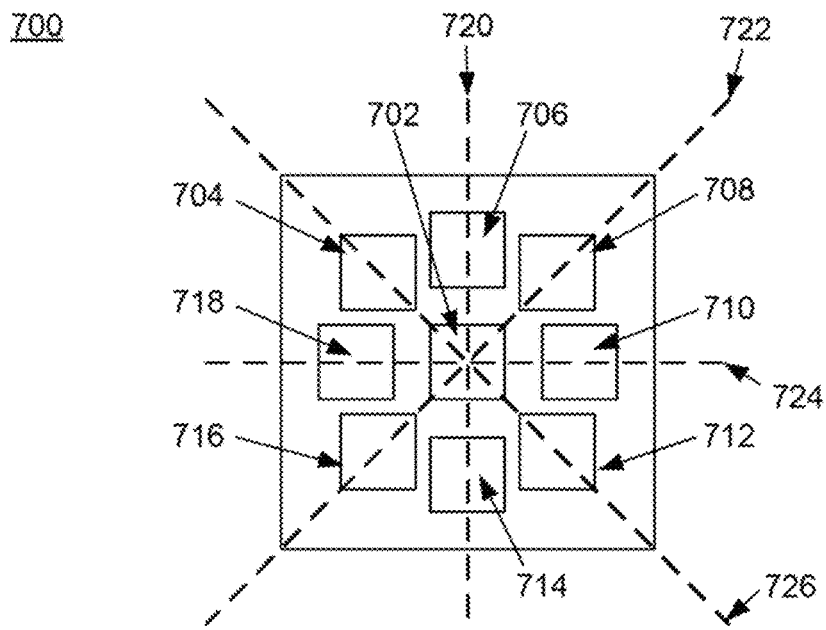
FIGS. 7A and 7B depict the antenna array of FIG. 6 synthesizing a beam in different physical directions, according to embodiments.
Figure 7B:
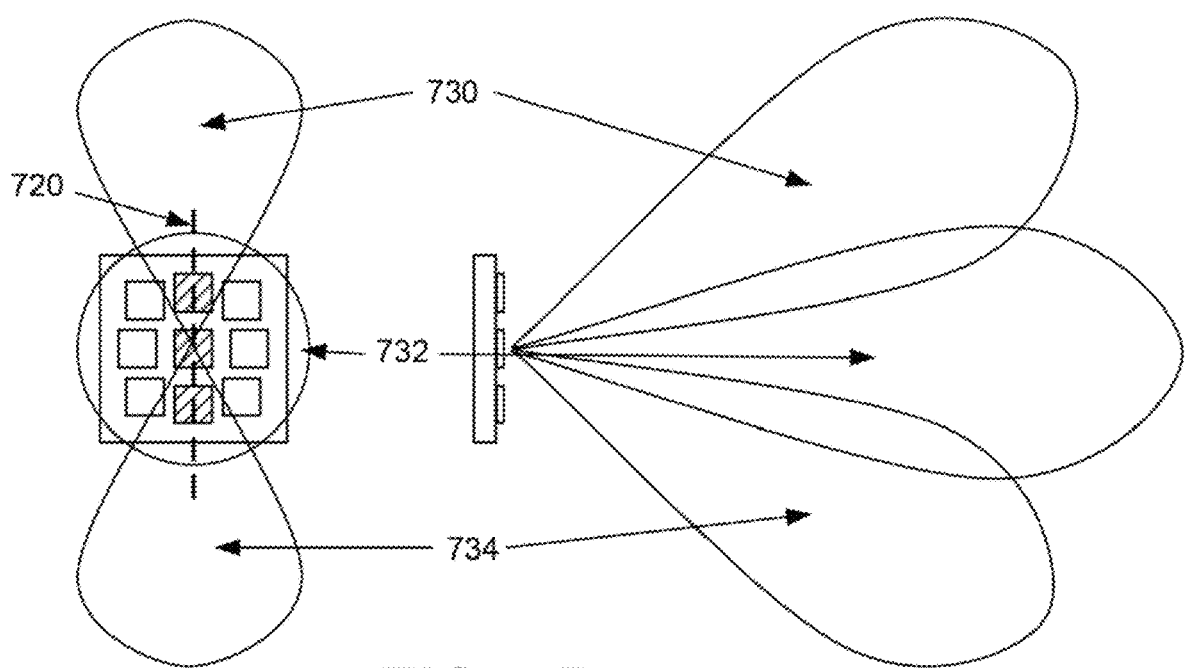

FIGS. 7A and 7B show the directions of some of the RF beams that SBA 700, similar to SBA 600 in FIG. 6, can generate. SBA 700 has nine antenna elements 702-718, with element 702 at the center and elements 704-718 around it. The shape and direction of the beam that SBA 700 generates depends on the signals to/from each element. Suppose that SBR 700 transmits using primarily elements 702, 706, and 714. Then, depending on the amplitude and phase of the signals applied to these elements, SBA 700 can steer a beam along the direction indicated by dashed line 720. In a similar fashion, suppose that SBR 700 transmits primarily using elements 702, 708, and 716. Then, depending on the amplitude and phase of the signals applied to these elements, SBA 700 can steer a beam along the direction indicated by dashed line 722. Of course, other steering arrangements are possible, including using all 9 elements to transmit and/or receive in arbitrary directions and to generate narrow beams.

FIG. 7B shows how RF beams with different directions can be synthesized using antenna elements located along line 720, with the diagram to the left depicting a head-on view similar to FIG. 7A and the diagram to the right depicting a side view. As described above, the beam direction can be controlled by varying the amplitude and phase of the signals to/from the antenna elements. For example, by applying a leading signal phase to element 706, an intermediate signal phase to element 702, and a trailing signal phase to element 714, the SBA will tend to steer its beam downward as in beam 734. Switching leading and lagging from elements 706/702 to elements 702/706 will tend to steer the beam upwards as in beam 730. Of course, the actual beam shape depends on both the magnitude of the phase shifting and the magnitude of the amplitude scaling (if any).

Figure 8:
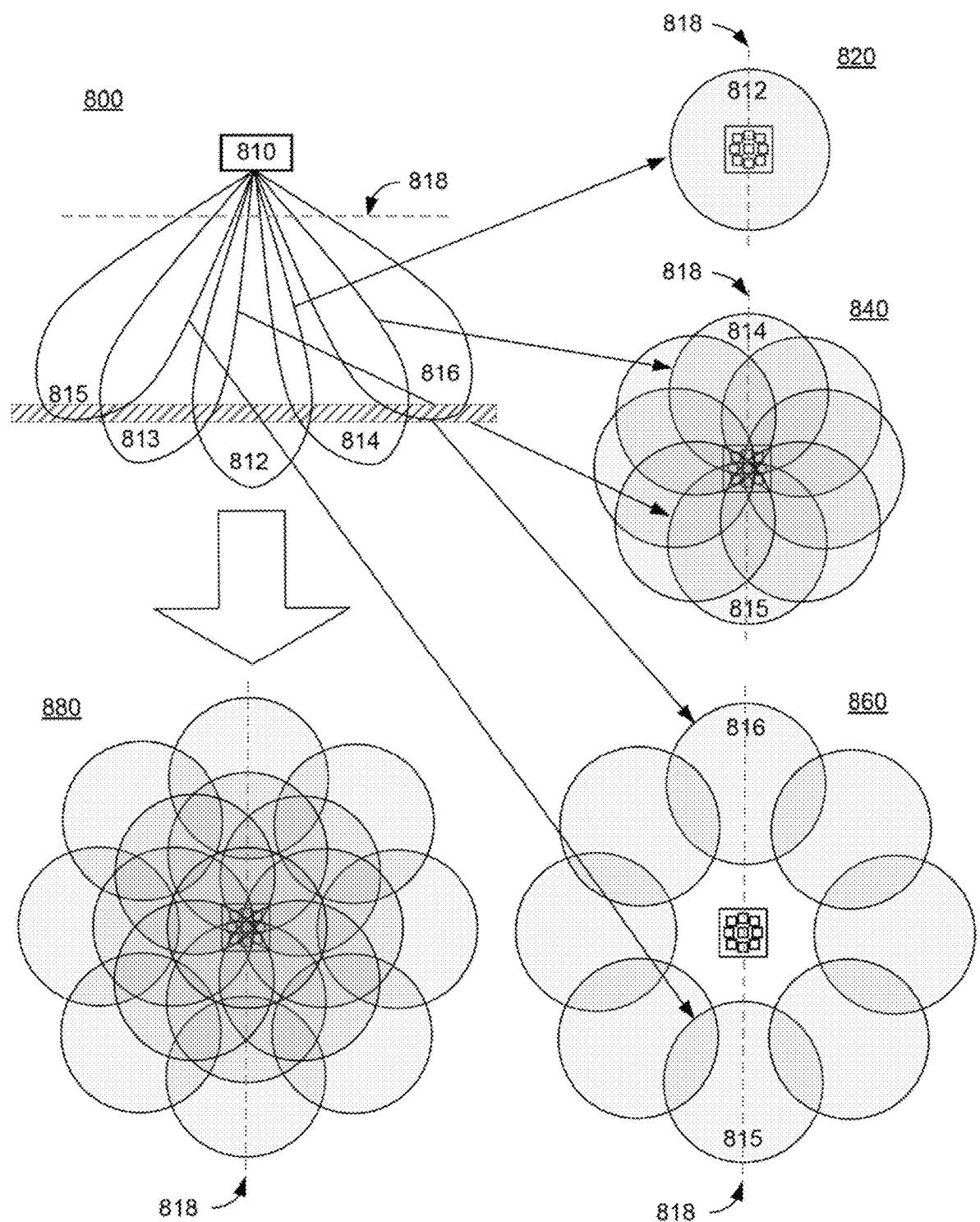
FIG. 8 depicts some of the potential beam locations that can be synthesized by the antenna array of FIG. 6, according to embodiments.

FIG. 8 depicts potential beams from an SBR according to embodiments. Diagram 800 depicts a side perspective of SBR 810, capable of synthesizing at least five different RF beams 812, 813, 814, 815, and 816, arranged along line 818 (similar to line 720 in FIG. 7A), with each RF beam pointed in a different direction.

Diagrams 820, 840, 860, and 880 depict coverage areas, shown as shaded circles, of the beam patterns generated by SBR 810. A beam generated by an SBR has a coverage volume, also known as the beam's "field-of-view (FoV)", which is a volume in three-dimensional space where, during transmission, the transmitted energy density exceeds a threshold, and where, during receiving, the received energy density exceeds a threshold. A beam's coverage area is a projection of the beam's FoV on a surface. The FoV and coverage area may be different during transmit and receive, and may vary with reader or tag power, the thresholds, the distance between the SBR and the surface, and other parameters.

Diagram 820 depicts the coverage area of central beam 812. Diagram 840 depicts the coverage areas of the inner beams such as 814 and 815. Diagram 860 depicts the coverage areas of the outer beams such as 815 and 816. Finally, diagram 880 depicts the total coverage area of all the beams formed by SBR 810. As shown in diagrams 820-880, beam coverage areas may overlap. For example, inner beam 814 may overlap with the central beam 812, with one or more other inner beams, and with one or more outer beams.

Whereas SBR 810 is depicted as being able to generate and switch between five beams on an axis (e.g., axis 818), in other embodiments an SBR may generate and switch between more or fewer beams on any given axis. Similarly, whereas SBR 810 is depicted as being able to generate beams on four different axes (e.g., axes 720, 722, 724, and 726 in FIG. 7A), in other embodiments an SBR may be configured to generate beams on more or fewer axes. An individual beam's coverage area in FIG. 8 and subsequent figures is depicted as circular for simplicity, and in actuality may be of any suitable shape, and may vary based on interactions between the different elements that form the beam, as well as the orientation and topology of the surface on which the coverage area is projected. For example, a beam may have a non-circular coverage area. As another example, a circular beam that illuminates a surface with a non-perpendicular angle may project an elliptical coverage area on the surface.

In general, an SBR synthesizes an RF beam to point at locations (e.g. beam areas-of-coverage shown in FIG. 8), for durations, and at times according to a scanning pattern, which may be predetermined or dynamic. A pointing location can be identified by the one or more SBRs as a beam indicator (such as a numeric indicator), a location on the floor of a facility in which the SBRs are located, a set of Cartesian or polar coordinates, or any other suitable location identifier.

In some embodiments, the scan pattern is a sequence of target locations and an SBR may synthesize beams to point at the different target locations based on a timer, a trigger signal generated by the SBR or a controller, and/or communications from one or more other readers. In some embodiments, the scan pattern is at least one target location and at least one corresponding target-location time, defined as the time at which two different SBRs point to the target location. The target-location time may be absolute (for example, 4:00 pm) or relative (for example, ten milliseconds after a trigger or timer signal or communication). An SBR may store the scan pattern in memory, receive a scan pattern from a controller (a separate controller module, another reader/SBR, a network device, or some other controlling entity), generate a scan pattern using information received from a controller or other readers, generate a scan pattern randomly, or generate a scan pattern based on any other suitable parameter(s). In some embodiments, an SBR's scan pattern may be overridden temporarily (or permanently) by a controller or another reader.

Figure 9:
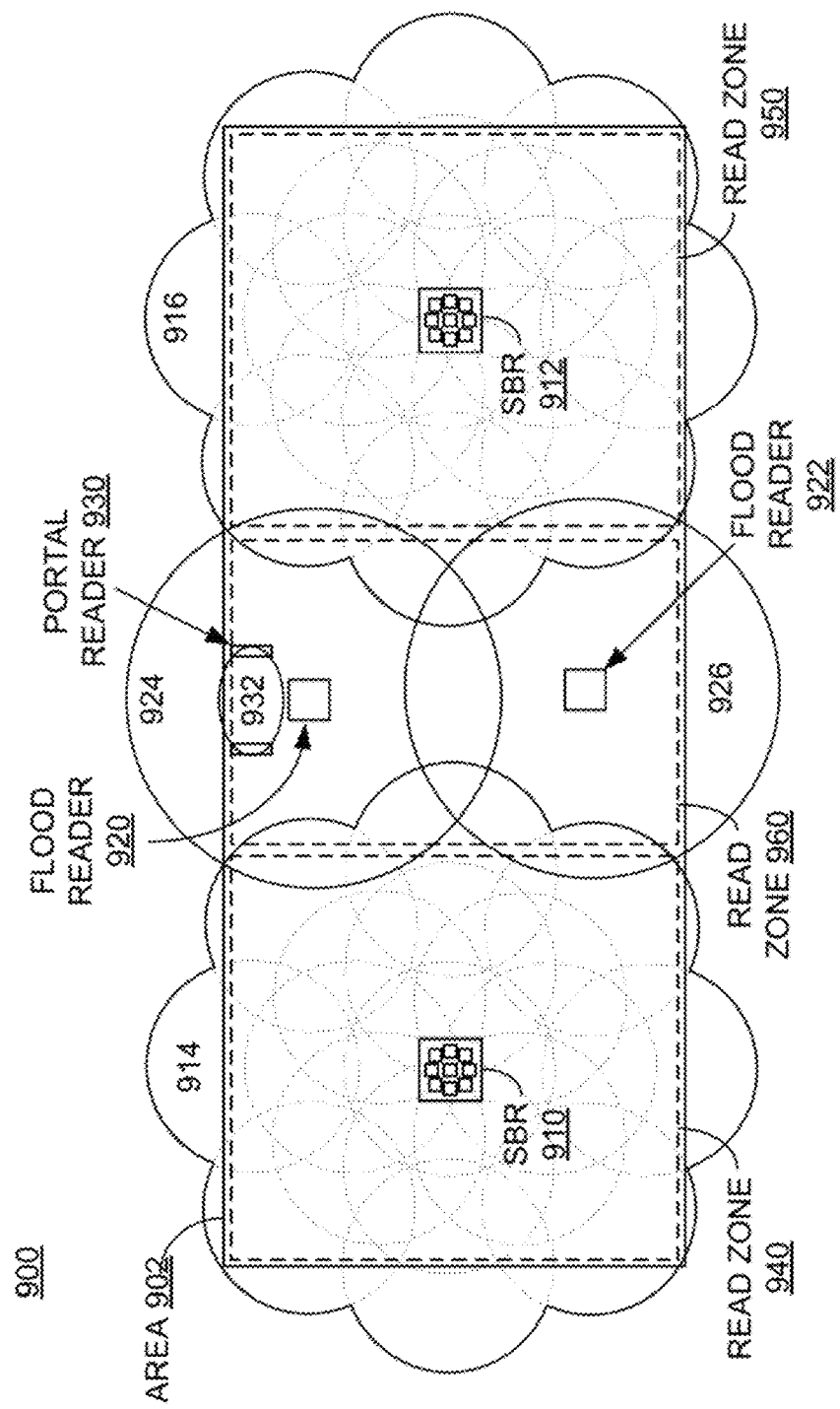
FIG. 9 illustrates how multiple readers and antennas may be used to provide multiple zones within a space, according to embodiments.

In some embodiments, multiple readers or antennas may be combined to detect and inventory tags or tagged items over a particular area or volume. FIG. 9 illustrates how multiple readers and antennas may be used to provide multiple zones within a space 902, according to embodiments. Diagram 900 is a top-down view of space 902, which may represent part or all of a facility such as a building, yard, retail store, laboratory, warehouse, construction facility, plant, military base, airport, ship, parking lot, shipping container, portion or section of the above, a location within or associated with one of the above, or similar. In some embodiments, readers and antennas may be deployed to provide coverage of at least a portion of space 902, if not substantially the entire space 902. For example, SBRs 910 and 912, flood readers 920 and 922, and a portal reader 930 may be deployed to provide coverage in space 902.

Each of the readers or antennas deployed in space 902 may be configured to provide a particular coverage volume. For example, SBRs 910 and 912, similar to those described above, may be mounted to provide coverage volumes 914 and 916, represented in diagram 900 as a projection of the coverage volumes on a surface (e.g., the floor of the space 902). In some embodiments, SBRs 910/912 may be mounted on or suspended from a ceiling or a standalone support and oriented downward, or may be mounted on or under a floor and oriented upward. Flood readers 920 and 922, unlike SBRs, may be configured to each generate a single, relatively static beam. Similar to SBRs 910/912, flood readers 920 and 922 may be mounted to provide coverage volumes 924 and 926. Portal reader 930, which may be configured to read tags passing through a relatively narrow area such as a corridor, entrance, or exit, may be mounted on a stand, to a wall, in the ceiling or floor, or adjacent to a doorway or portal (above, below, or to the sides) to provide coverage volume 932. While in diagram 900 each coverage volume is associated with a reader, in other embodiments a coverage volume may be associated with an antenna. In these embodiments, a single reader may be coupled to multiple antennas, each of which have an associated coverage volume.

In some embodiments, space 902 may also be divided into one or more zones, such as zones 940, 950, and 960. A "zone" (or alternately a "read zone") as used herein is a particular volume of space defined for inventorying purposes. A zone may correspond exactly to a reader/antenna coverage volume, may include portions of multiple coverage volumes, or may correspond to part of a coverage volume (for example, an individual beam of an SBR). In some embodiments, zones may correspond to particular regions in a facility. For example, different rooms, corridors, entrances, and exits in a building may be different zones. As another example, individual fixtures, such as shelving units, individual shelves, cabinets, or tables may be different zones. In some embodiments, different parts of an individual fixture (e.g., different sections of a shelf) may be different zones.

Figure 10:
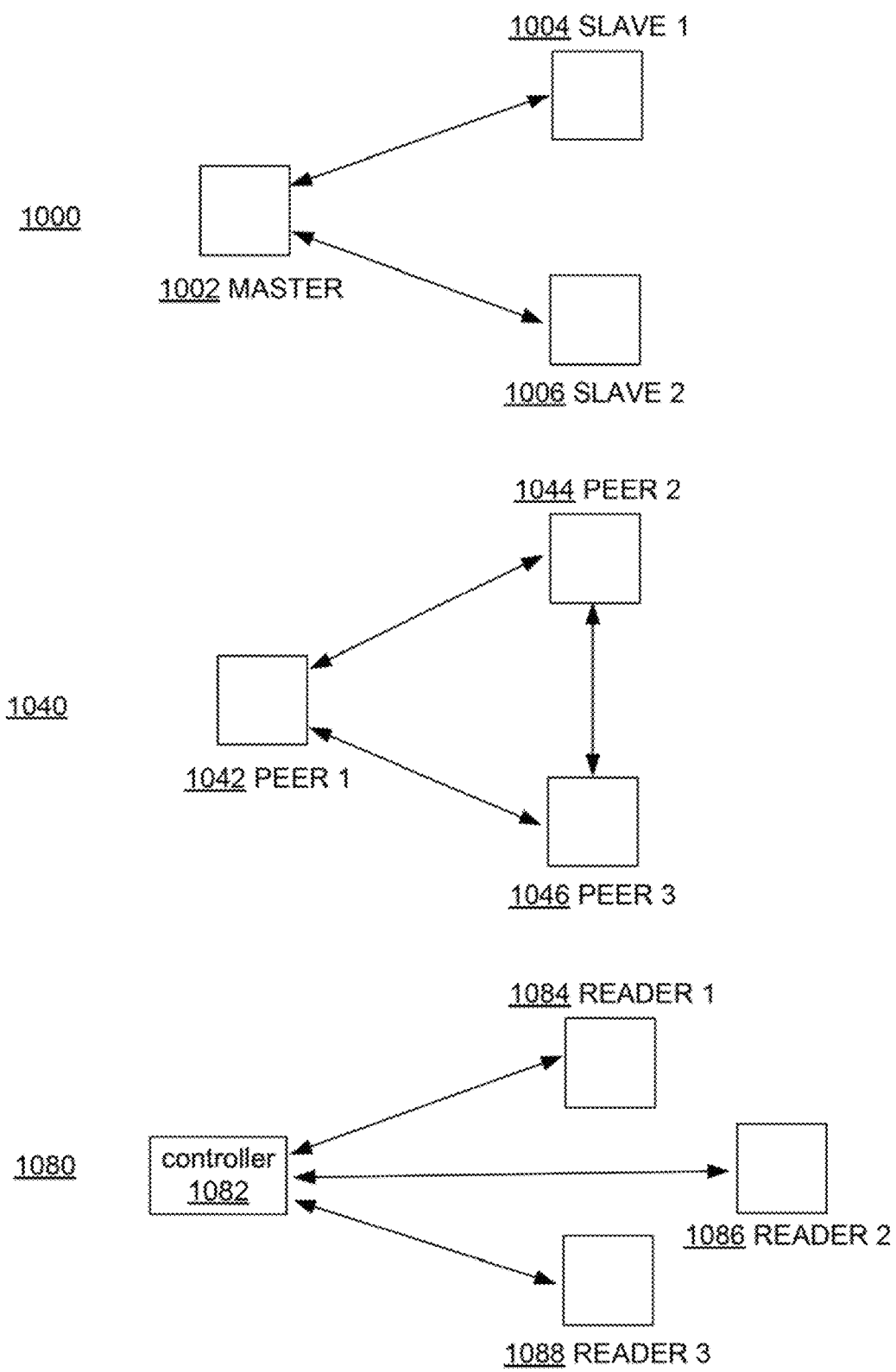
FIG. 10 depicts methods of controlling multiple readers according to embodiments.

In some embodiments, multiple readers within a space such as space 902 may be configured to exchange information with each other about target locations, scan patterns, scan timing, beam configuration (for SBRs), tags, and roles. FIG. 10 depicts a variety of ways in which readers can receive and/or exchange such information. Diagram 1000 depicts a first configuration in which a master reader 1002 coordinates the operations of two slave readers 1004 and 1006. Diagram 1040 depicts a second configuration in which three readers 1042, 1044, and 1046 coordinate operation via peer-to-peer communications. Diagram 1080 depicts a third configuration in which a centralized controller 1082 coordinates the operations of three readers 1084, 1086, and 1088. Of course, multiple variants on these themes are possible including using more or less readers; mixing the configuration (for example, a controller coordinating peer-to-peer communications); using multiple controllers, and endless other combinations as will be obvious to those of ordinary skill in the art. Communication between readers and controllers (if present) can be implemented using a wired connection (e.g., Ethernet, parallel, serial, or other suitable wired protocol), a wireless connection (e.g. WiFi, cellular, Bluetooth, or other suitable wireless protocol), a point-to-point protocol, a packet or address-based protocol, or any other suitable connection type or protocol.

Figure 11:
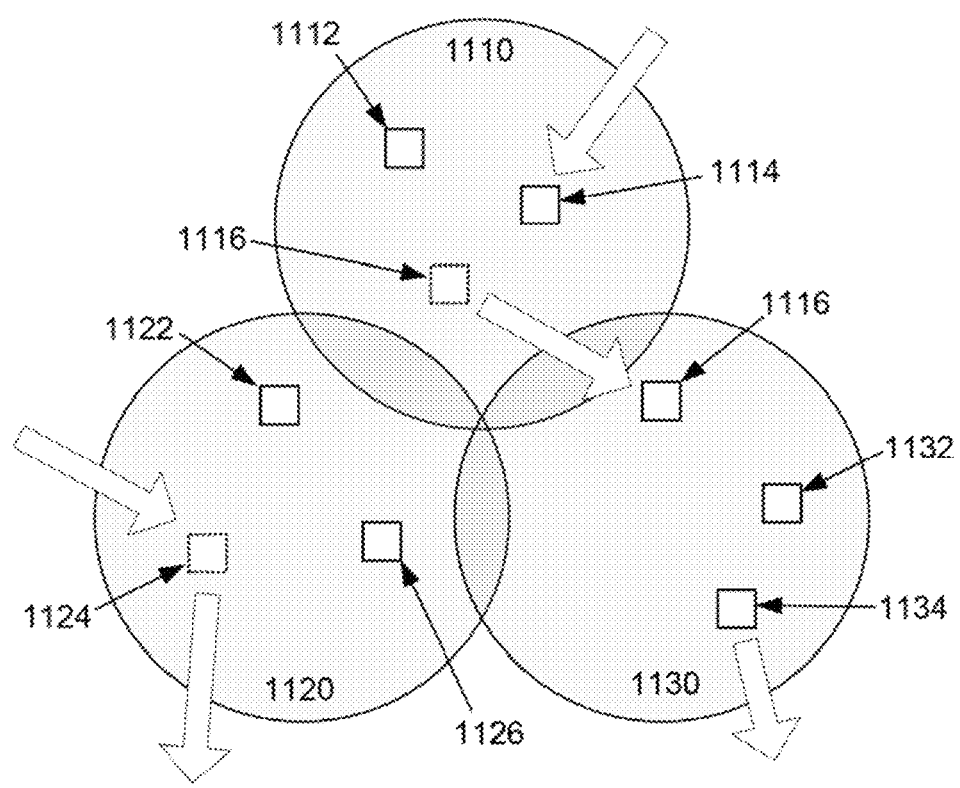
FIG. 11 depicts how RFID tags may transition into and out of zones.

When a space is partitioned into different zones, tags or tagged items may transition into, out of, and between zones. FIG. 11 depicts how RFID tags may transition into and out of zones. Diagram 1100 depicts three different zones 1110, 1120, and 1130, each of which may overlap at least slightly with the other zones. Zones 1110, 1120, and 1130 may correspond to at least a portion of the coverage volume of a particular reader, antenna, or reader-generated beam, or may correspond to a combination of multiple coverage volumes, as described above. Tags, corresponding to tagged items, may be located in each zone. For example, tags 1112 and 1116 are initially located in zone 1110, tags 1122 and 1126 are initially located in zone 1120, and tags 1132 and 1134 are initially located in zone 1130. Tags may then move into, out of, or between the different zones. For example, tag 1114 moves into zone 1110 from another zone (not indicated in diagram 1100) or from an exterior location. Similarly, tag 1124 first moves into and subsequently moves out of zone 1120. Tag 1134 is initially located in zone 1130 and then subsequently moves out of zone 1130. Tag 1116, initially located in zone 1110, moves out of zone 1110 into zone 1130. In these situations, tag tracking systems may be configured to track the location and movement of tags and tagged items into, out of, and between zones in order to maintain an accurate count of the tags that are present.

Determining the location of a tag or tagged item is complicated by the fact that tag detection is inherently stochastic. For example, while a reader should detect a tag if the tag has sufficient power and is sufficiently close to the reader, there is no guarantee that the reader will always detect the tag. In situations where multiple tags are present in a deployment environment, tag detection may be further complicated by other factors, such as tag and antenna orientation, interference with other tags and/or other passive RF absorbers/reflectors, and interference from RF sources.

The probability that a tag or item can be detected can be represented by an "observability" parameter. The observability of a tag or item indicates the ease with which a tracking system can detect or locate the tag or item, as a function of one or more variables. For example, when a tag is close to a reader of the tracking system, has an unobstructed view to the reader, has a favorable orientation with respect to the reader antenna, and otherwise is easy for the reader to detect, the tag may have a relatively high observability. On the other hand, when a tag is far from the reader, is obstructed, has an unfavorable orientation, or is otherwise difficult for the reader to detect, the tag may have a relatively low observability. In some embodiments, an observability represents the likelihood that a tag or item that is present can be successfully read. An observability may include a detection probability (the probability that a present tag or item can be successfully detected in a given trial, where a trial can be defined as an attempt to detect a tag or item), a read rate as a function of number of trials (the number of successful tag or item reads over a given number of trials), a read rate as a function of time (the number of successful tag or item reads over a given time duration), or any other suitable measure of the likelihood of successfully detecting a present tag or item. In some embodiments, observabilities may be location-dependent. For example, a tag or item may have different observabilities on different beams of a reader system configured to generate multiple beams, such as an SBR. Once computed, observabilities may then be used to determine a probability of tag/item presence or absence within a particular zone. Observabilities may be determined using any suitable statistical technique. In one embodiment, observabilities may be determined using a mean-and-variance technique. In this case, a tag or item observability may include an average detection rate (for example, detections per time duration, detections per number of trials, etc.) and a variance in detection rate. In other embodiments, any suitable technique for determining the ease of detecting a tag or item can be used to generate observabilities.

The observability of a tag or item can be used to determine the presence of the tag or item. Suppose that a represents whether a particular tag is absent from a particular zone, where $a=1$ indicates tag absence and $a=0$ indicates tag presence. Further suppose that e represents a tag read event for that particular tag, where $e=1$ indicates that the tag was read and $e=0$ indicates that the tag was not read.

Using the above parameters, a number of conditional probabilities may be determined. For example, $p(e=1|a=1)$, which is the probability that a tag is read ($e=1$) when the tag is absent ($a=1$) is 0 (that is, an absent tag will never result in a read of that tag). Similarly, $p(e=0|a=1)$, which is the probability that a tag is not read (e=0) when the tag is absent (a=1) is 1 (that is, an absent tag will always not be read). Further, p(a=0|e=1), which is the probability that a tag is present (a=0) when the tag is read (e=1) is 1 (that is, a tag that is read is always present), and p(a=1|e=1), which is the probability that a tag is absent (a=1) when the tag is read (e=1) is 0 (that is, a tag that is read cannot be absent).

The last remaining probability, p(a=1|e=0), represents the probability that a tag is absent if it is not read, and can be used by a tag tracking system to determine the probability of tag presence within a zone. Bayes' theorem provides that:

$$p(e|a)p(a)=p(a|e)p(e)$$

Solving for p(a|e), also known as the posterior probability, and substituting a=1 and e=0 provides an expression for the probability that a tag is absent if it is not read:

$$p(a=1 \mid e=0) = \frac{p(e=0 \mid a=1)p(a=1)}{p(e=0)}$$

The first term in the numerator, p(e=0|a=1), is 1 as stated above. The second term in the numerator, p(a=1), can be denoted as α, which represents the prior probability of a tag being absent. In some embodiments, α may be estimated based on the rate at which tags leave and enter the relevant field of view, and may be known or readily-estimable. The denominator may represent the unconditional probability of detecting item absence, and may be expanded:

$$P(e=0)=P(a=0)P(e|a=0)+p(a=1)p(e=0|a=1)$$

where p(a=1) is α, p(a=0) is (1−α), and p(e=0|a=1) is 1.

In some embodiments, p(e|a=0) may be estimated by modeling each attempt to read a tag as a Bernoulli trial with a probability of detection θ:

$$p(e|a=0)=\theta^e(1-\theta)^{1-e},$$

where the probability of a successful trial where the tag is read (e=1) is:

$$p(e=1|a=0)=\theta^1(1-\theta)^{1-1}=\theta$$

and the probability of a failed trial where the tag is not read (e=0) is:

$$p(e=0|a=0)=\theta^0(1-\theta)^{1-0}=(1-\theta)$$

The probability of detection θ, which in some embodiments is the tag observability, may depend on various factors, as described above. For example, when a tag is close to a reader, has an unobstructed view to the reader, has a favorable orientation with respect to the reader antenna, and otherwise is easy for the reader to detect, θ may be close to 1. On the other hand, when a tag is far from a reader, is obstructed, has an unfavorable orientation, or is otherwise difficult for the reader to detect, θ may be close to 0.

Substituting the Bernoulli trial expression for p(e|a=0) (with e set to 0) into p(e=0) results in the following expression for the probability of tag absence:

$$p(a=1 \mid e=0) = \frac{\alpha}{\alpha + (1-\alpha)(1-\theta)}$$

If a number of consecutive absences, failed tag reads, or failed trials M are observed, then the probability of absence given a series of events e may be written as:

$$p(a=1 \mid e) = \frac{\alpha}{\alpha + (1-\alpha)(1-\theta)^M}$$

which may also be rewritten as a probability of presence ρ:

$$\rho = \frac{(1-\alpha)(1-\theta)^M}{\alpha + (1-\alpha)(1-\theta)^M}$$

In some embodiments, especially when the number of trials is relatively small, a point estimate for θ may be derived using an expected value technique, resulting in the following expression:

$$\theta = \frac{K+1}{N+2}$$

where N represents the number of read attempts or trials and K represents the number of successful tag reads or successful trials. Tag absence or presence probabilities may then be determined by using this expression for θ in the expressions for p(a=1|e=0), p(a=1|e), and ρ provided above and substituting for the appropriate parameters α, N, K, and M.

In another embodiment, Bayesian methods may be used to estimate a consecutive-failure probability p(M N, K), which is the probability of observing M consecutive absences of a present tag given a prior detection probability distribution defined by K successes in N trials immediately preceding the M absences. As M increases, the corresponding consecutive-failure probability may decrease, which represents the decrease in likelihood that a tag is still present as the number of consecutive failures to detect the tag increases. The consecutive-failure probability may then be used as a predictive model for tag presence or absence. If a Bernoulli likelihood model of tag reads is combined with a Beta prior distribution, p(M|N, K) may be given by:

$$p(M \mid N, K) = \frac{(N+M-K)!(N+1)!}{(N-K)!(N+M+1)!}$$

Tag absence or presence probabilities may then be estimated using the consecutive-failure probability p(M|N, K) and substituting for the appropriate parameters N, K, and M.

Figure 12:
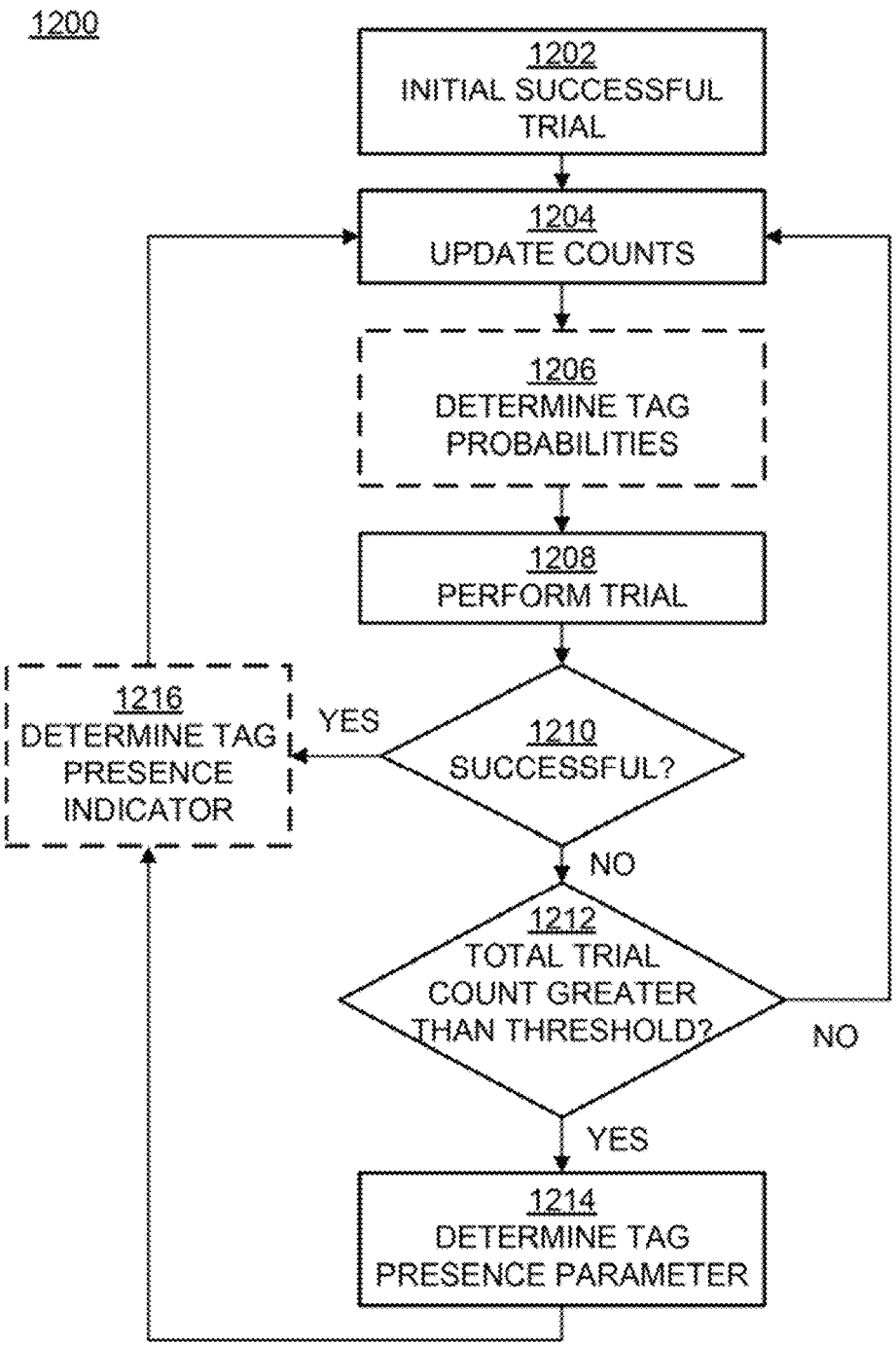
FIG. 12 is a flowchart of a process to determine whether an RFID tag is present in a zone.

FIG. 12 is a flowchart of a process 1200 to determine whether an RFID tag is present in a zone. Process 1200 may begin at step 1202, where a tag tracking system performs an initial successful trial, or read attempt, in a particular zone. The tag tracking system may perform a trial by attempting to request an identifier from a particular tag in the zone. For example, a reader coupled to or part of the tag tracking system may transmit an RF wave into the zone and attempt to "query" tags in the zone by modulating the RF wave to include a command requesting a tag identifier. In some embodiments, the command requesting the tag identifier may be an inventorying command according to the Gen2 Specification, such as a Query command, a QueryAdjust command, a QueryRep command, or an ACK command, or any other Gen2-compliant or non-Gen2-compliant command that requests an identifier from a tag. A trial may be considered a success if the tag tracking system receives a message (for example, as a backscatter-modulated signal) during the trial that includes an identifier specific to the particular tag. A trial may be considered failed or unsuccessful if during the trial the tag tracking system does not receive any messages that include the identifier.

At step 1204, the tag tracking system may update one or more counts associated with the presence detection process. For example, the tag tracking system may update a total number of attempted reads or trials (e.g., "N" as described above), a total number of successful trials (e.g., "K" as described above), and/or a number of consecutive failed trials (e.g., "M" as described above). The tag tracking system may update the counts based on one or more preceding steps. For example, if the tag tracking system arrives at step 1204 from step 1202, in which a successful trial occurred (i.e., an identifier was received from a particular tag), then the tag tracking system may increment the total number of attempted trials and the total number of successful trials to account for the initial tag detection at step 1202.

At step 1206, the tag tracking system may then determine or update one or more current tag probabilities. The tag probabilities may include a tag observability, which represents the likelihood that a tracking system can detect a present tag. In some embodiments, the tag observability may include a tag detection rate mean and variance and/or a tag detection probability mean and variance, as described above. The tag probabilities may also include a tag presence probability or a tag absence probability.

In some embodiments, one or more of the tag probabilities may be probability functions based on one or more variables. For example, a tag observability probability function describes the likelihood that a tag can be detected as a function of one or more variables. A tag presence probability function or a tag absence probability function represent the probability that a particular tag is present or absent, respectively, as a function of one or more variables.

The tag probabilities may be computed by the tag tracking system based on a posterior probability, as described above. For example, the tag tracking system may use the expressions for $p(a=1|e=0)$, $p(a=1|e)$, or $p$ provided above, the tag detection probability $\theta$, and the counts updated in step 1204 to determine tag presence as a function of consecutive failed trials ("M"). When the tag detection probability $\theta$ is treated as a probability density function, the resulting tag probabilities may also be in the form of probability density functions. The tag probabilities may also include a consecutive-failure probability function, which represents the probability that a particular number of consecutive failures would occur while attempting to read a present tag. For example, the tag tracking system may use the expression $p(M|N, K)$ described above and the counts updated in step 1204 to estimate tag presence as a function of consecutive failed trials.

In some embodiments, the tag tracking system may determine the tag probabilities and/or estimate tag presence only after sufficient data have been collected. For example, the tag tracking system may not determine the tag probabilities or estimate tag presence until a total trial count is equal to or greater than a trial threshold, as described below in step 1212.

At step 1208, the tag tracking system performs a trial by attempting to read the tag. For example, the tag tracking system may attempt to read the tag in one or more read cycles in a certain zone, which may be defined as a time duration in which the tag tracking system has attempted to inventory the tags visible within the zone before either beginning the inventory process within the zone again or attempting to inventory tags within another zone. The duration of a read cycle may be predetermined or dynamically updated based on, for example, the number of tags previously read in that zone. In another embodiment, a trial may involve completion of a scan pattern where tags within multiple zones are read, as described above with respect to SBRs.

At step 1210, the tag tracking system determines whether the trial performed at step 1208 was successful. A trial is successful, at least with respect to a particular tag, if the tag tracking system detects that tag (as described in step 1202) during the trial. If the tag tracking system determines at step 1210 that the trial was successful, then at step 1216 the tag tracking system may determine a tag presence indicator, as described below, and then may transition to step 1204, where it updates counts as described above. In some embodiments, if the trial at 1208 is successful, the tag tracking system may update counts at step 1204 by incrementing K, resetting M to zero if M was greater than zero, and increasing N by the greater of one or M.

Determining whether the trial was unsuccessful may be more complicated, because there may not be a specific event associated with the nondetection of a tag (as opposed to the detection of a tag, which involves receiving a tag response). In some embodiments, the tag tracking system may determine that a tag was not detected at the end of a trial during which the tag tracking system expected to detect the tag. For example, suppose that the tag tracking system receives a tag response from a particular tag while inventorying within a zone in a particular trial. In the next trial, the tag tracking system may expect to receive a tag response from that same tag while inventorying within the zone if the tag tracking system has no reason to believe that the tag has left the zone. When the next trial is complete, if the tag tracking system has not received the expected tag response, the tag tracking system may conclude that the particular tag has not been detected.

If the tag tracking system determines at step 1210 that the trial was unsuccessful, at step 1212 the tag tracking system may determine whether the total trial count, including both successful and unsuccessful trials, exceeds a particular trial threshold. In some embodiments, trials performed while the total trial count is equal to or less than the trial threshold may be referred to as "initial trials", and may provide baseline tag presence data that account for environmental factors that may prevent tags from being correctly read. The trial threshold may be predetermined or dynamically determined and updated, and its value may be selected to provide appropriate baseline tag presence data. In some embodiments, the trial threshold may be set based on one or more parameters of the operating environment or system. For example, the trial threshold may be based on physical or electromagnetic characteristics of the tracked tag or item, prior observational or transactional history of the tag or item, an estimated location of the tag or item, a transmission frequency, the average strength or variance in strength of a signal received from the tag or item, a Doppler shift in the frequency of a signal received from the tag or item, a density of items in the zone, or any other suitable parameter. In other embodiments, "initial trials" may merely be trials that occur before one or more "subsequent trials", regardless of whether the total trial count is equal to or less than the trial threshold.

If at step 1212 the tag tracking system determines that the total trial count does not exceed the trial threshold, the tag tracking system may proceed to step 1204, where it updates counts as described above. For example, the tag tracking system may increment the total number of attempted trials, but not the total number of successful trials. The tag tracking system may or may not subsequently determine or update the tag probabilities at step 1206. For example, if the total trial count is less than the trial threshold, then the tag tracking system may not determine or update the tag probabilities. If the total trial count is equal to the trial threshold, then the tag tracking system may determine or update the tag probabilities. In some embodiments, the tag tracking system determines or updates the tag probabilities regardless of the total trial count. In yet other embodiments, the tag tracking system may not update the tag probabilities even if the total trial count exceeds the trial threshold, as described below.

On the other hand, if at step 1212 the tag tracking system determines that the total trial count exceeds the trial threshold, at step 1214 the tag tracking system may determine a tag presence parameter based on the tag probabilities determined at step 1206, and optionally one or more current parameters or counts (e.g., the current value of consecutive failed trials M). In one embodiment, the determined tag presence parameter may be a current detection probability or read rate, determined based on the trial count data collected since the last time the tag probabilities were updated. The determined tag presence parameter may also (or instead) be a tag absence probability that represents the probability a tag is absent from the zone, or a tag presence probability that represents the probability a tag is present in the zone. In some embodiments, the determined tag presence parameter may be a consecutive-failure probability, or the probability that a particular number of consecutive failed trials are observed given a prior detection probability distribution, as described above.

At step 1216, the tag tracking system may then determine a tag presence indicator. The tag presence indicator represents whether the tag tracking system considers the tag present or absent, and may be implemented as a flag, a bit in memory, an entry in a database, or any other suitable means of data storage. If the tag tracking system reaches step 1216 as a result of a successful trial in step 1210, the tag tracking system may consider the tag "present" and set the tag presence indicator accordingly. If the tag tracking system reaches step 1216 from step 1214, the tag tracking system may determine the tag presence indicator based on the tag presence parameter determined at step 1214.

In some embodiments, the tag tracking system determines the tag presence indicator by comparing the tag presence parameter determined at step 1214 to a tag presence threshold. When the tag presence parameter satisfies the tag presence threshold, the tag tracking system may consider the tag "present" and set the tag presence indicator accordingly. On the other hand, when the tag presence parameter does not satisfy the tag presence threshold, the tag tracking system may consider the tag "absent" and set the tag presence indicator accordingly. The tag presence threshold may be predetermined before process 1200, determined during process 1200, and/or updated during process 1200. In some embodiments, the tag presence threshold may be determined using a training process, such as the one described below in FIG. 15.

As described above, in some embodiments a tag presence parameter can be in terms of tag detection rate, tag detection probability, tag presence probability, and/or tag absence probability. If the tag presence parameter is in terms of tag detection rate or probability, then the tag presence threshold may represent a variance from an average tag detection rate or probability. In this case, a tag presence parameter that is either greater than the observability, or less than the observability but within the variance, may satisfy the threshold, whereas a tag presence parameter that is less than the observability but outside the variance may not satisfy the threshold. If the tag presence parameter is in terms of tag presence probability, the tag presence threshold may represent a tag presence probability threshold, and a tag presence parameter that is above the tag presence probability threshold may satisfy the threshold, whereas a tag presence parameter that is below the tag presence probability threshold may not satisfy the threshold. If a tag presence parameter is represented in terms of tag absence probability, the tag presence threshold may represent a tag absence probability threshold, and a tag presence parameter that is below the tag absence probability threshold may satisfy the threshold, whereas a tag presence parameter that is above the tag absence probability threshold may not satisfy the threshold. A tag presence parameter that is at a particular threshold may or may not satisfy the threshold.

In another embodiment, a tag presence parameter may be in terms of consecutive-failure probability, and the tag presence threshold may represent a consecutive-failure probability threshold. A tag presence parameter that is above the consecutive-failure probability threshold may satisfy the threshold, whereas a tag presence parameter that is below the consecutive-failure probability threshold may not satisfy the threshold. A tag presence parameter that is equal to the consecutive-failure probability threshold may or may not satisfy the threshold.

In yet another embodiment, the tag presence threshold may be represented as a consecutive-failed-trial threshold, and the tag presence parameter may be represented as a number of consecutive failed trials of the tag (e.g., "M" as described above). If the number of failed trials is below the consecutive-failed-trial threshold, the consecutive-failed-trial threshold is satisfied, whereas if the number of failed trials is above the consecutive-failed-trial threshold, the consecutive-failed-trial threshold is not satisfied. If the number of consecutive failed trials of the tag is equal to the consecutive-failed-trial threshold, the tag tracking system may consider the threshold either satisfied or not satisfied. In some embodiments, the consecutive-failed-trial threshold may be calculated from the tag presence/absence probability thresholds and/or the consecutive-failure probability threshold described above, or vice-versa.

Regardless of how the tag presence indicator is determined, after step 1216 the tag tracking system proceeds to step 1204, where it updates counts as described above. In some embodiments, the tag tracking system may increment N and K if the trial of step 1208 was successful, or only M if the trial of step 1208 was unsuccessful.

As described above, the tag tracking system may update the tag probabilities at step 1206 if the total trial count is greater than the trial threshold and the most recent trial was successful. In some embodiments, if the most recent trial was unsuccessful, the tag tracking system may not update the tag probabilities at step 1206. Instead, the tag tracking system may continue to use the last updated tag probabilities (i.e., the tag probabilities determined based on the last successful trial) in the tag presence parameter determination at step 1214, until the next successful trial or the tag is finally determined to be absent. In another embodiment, the tag tracking system may continuously update the tag probabilities based on consecutive failed trials, and may use the continuously-updated probabilities in the tag presence parameter determination.

Figure 13:
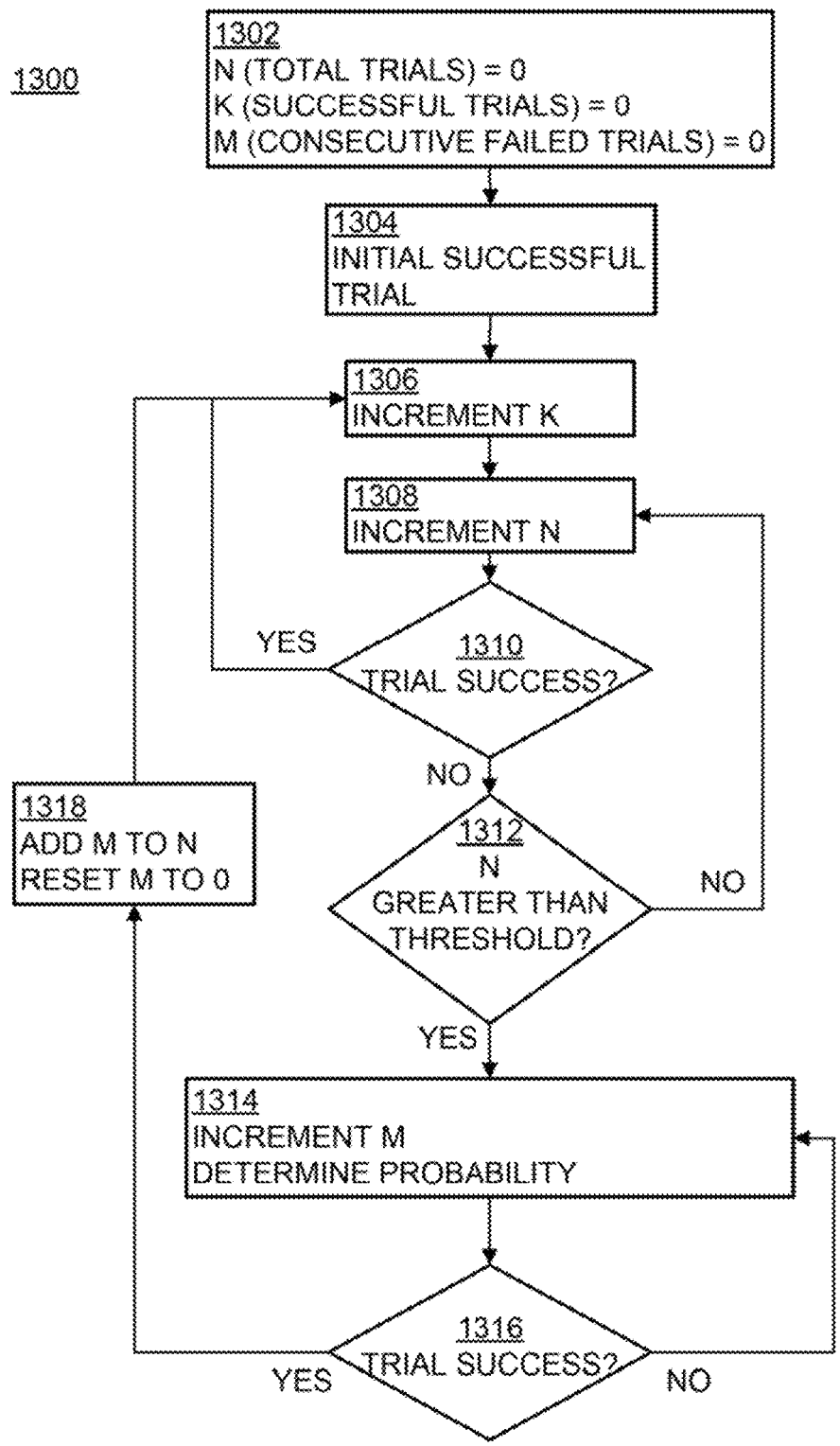
FIG. 13 is a flowchart of a process to determine a probability associated with tag presence.

FIG. 13 is a flowchart of a process 1300 to determine a probability associated with tag presence. Process 1300 may be used to determine a probability of tag detection, such as θ as described above, or a consecutive-failure probability p(M|N, K), also described above. In some embodiments, process 1300 may be executed by a tag tracking system at the same time as a tag presence detection process (for example, process 1200).

Process 1300 begins at step 1302, in which the tag tracking system may initialize a number of counts or variables for tracking the probability that a present tag is detected.

In some embodiments, the number of total trials or read attempts N, the number of successful trials K, and the number of consecutive failed trials M, may be tracked and initialized as "0" at step 1302.

At step 1304, the tag tracking system may perform an initial successful trial and receive an identifier from the tag, similar to step 1202 in process 1200. Upon the initial trial success, at step 1306 the tag tracking system increments K, the number of successful trials, because the tag tracking system has succeeded in reading the tag once. At step 1308 the tag tracking system then also increments N, the number of total trials, because the initial detection of the tag corresponds to a trial.

At step 1310 the tag tracking system may perform a first subsequent trial and determine whether the first subsequent trial is successful (i.e., the tag identifier was received again). If the first subsequent trial is successful, the tag tracking system again increments K at step 1306 and N at step 1308. If the first subsequent trial is not successful, then at step 1312 the tag tracking system determines whether the number of total trials N has exceeded a trial threshold. If N has not exceeded the trial threshold, then the tag tracking system increments N at step 1308 but does not increment K (because the trial failed) or M (because M is only tracked once the trial threshold is exceeded). The trial threshold may be provided to allow for tag read process startup purposes or to account for environmental factors, and may be predetermined and/or dynamically determined.

On the other hand, if the tag tracking system determines at step 1312 that N has exceeded the threshold, then at step 1314 the tag tracking system increments M, the number of consecutive failed trials, and determines a probability associated with the presence of the tag. In one embodiment, the tag tracking system may determine a probability that the tag is present or absent. For example, the tag tracking system may use a Bayesian predictive model combining a Bernoulli likelihood with a Beta prior to compute a consecutive failure probability p(M|N, K) as described above:

$$p(M \mid N, K) = \frac{(N + M - K)!(N + 1)!}{(N - K)!(N + M + 1)!}$$

The tag tracking system may then use the consecutive-failure probability to estimate whether the tag is present or absent (e.g., as in step 1216), for example by comparison with a consecutive-failure probability threshold.

In another embodiment, at step 1314 the tag tracking system may determine a point estimate of the tag detection probability as described above:

$$\theta = \frac{K + 1}{N + 2}$$

The tag tracking system may then use the determined value of θ to determine the tag presence parameter (e.g., as in step 1214) and estimate whether the tag is present or absent (e.g., as in step 1216).

Subsequently, at step 1316 the tag tracking system may perform a second subsequent trial. If the second subsequent trial is successful, the tag tracking system transitions to step 1318. At step 1318, the tag tracking system updates the total trials N by adding the consecutive failed trials M to the old value of N, and then resets M to zero. After step 1318, the tag tracking system returns to step 1306. On the other hand, if the second subsequent trial at step 1316 is unsuccessful, the tag tracking system again increments M and determines θ with the new value of M at step 1314.

Figure 14:
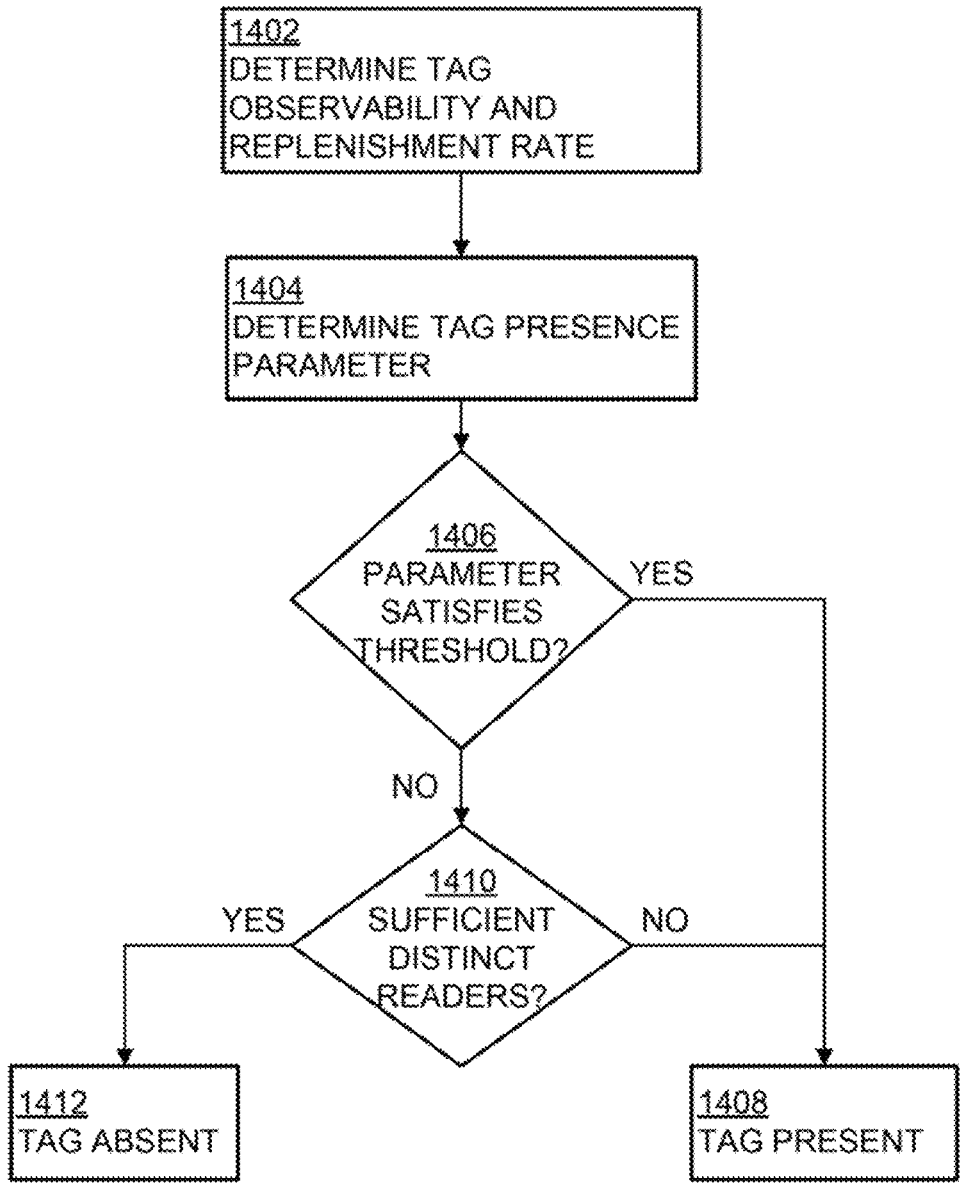
FIG. 14 is a flowchart of a process to determine whether an RFID tag is present.

FIG. 14 is a flowchart of a process 1400 to determine whether an RFID tag is present. In some embodiments, process 1400 may be executed by a tag tracking system at the same time as a tag presence determination process (for example, steps 1214 and 1216 in process 1200).

Process 1400 may begin at step 1402, where the tag tracking system determines a tag observability and a replenishment rate. The tag observability may include a detection probability θ, a read rate as a function of trials or time, or any other representation of the likelihood of detecting a tag that is present. The replenishment rate, also denoted as a, represents a rate at which tags are added or removed from the field of view of the tag tracking system, and may be estimated in some embodiments based on the combination of a rate of item theft, a rate of item sales, and a rate of item replacement.

At step 1404, the tag tracking system then determines a tag presence parameter, for example as described in step 1214. In one embodiment, the tag tracking system may determine the tag presence parameter as a current detection probability or read rate, based on the trial count data collected since the tag observability was last updated. In other embodiments, the tag tracking system may determine the tag presence parameter by computing the probability of presence p as described above, which represents the probability that a particular tag is present in a particular zone:

$$p = \frac{(1 - \alpha)(1 - \theta)^M}{\alpha + (1 - \alpha)(1 - \theta)^M}$$

The probability or presence ρ can be calculated by subtracting the tag absence probability (described above) from 1, and in other embodiments the tag absence probability can be used instead.

At step 1406, the tag tracking system may then determine whether the determined tag presence parameter satisfies a tag presence threshold, as described above in step 1216. If at step 1406 the tag tracking system determines that the tag presence parameter satisfies the tag presence threshold, then at step 1408 the tag tracking system may consider the tag present.

On the other hand, if at step 1406 the tag tracking system determines that the tag presence parameter does not satisfy the tag presence threshold, then at step 1410 the tag tracking system may determine whether sufficient distinct readers have been used to detect (or attempt to detect) the tag. For example, if only one distinct reader had the opportunity to detect a particular tag, the tag tracking system may not consider the tag detection (or nondetection) data sufficient to determine that the tag is absent. If the tag tracking system determines that there have not been sufficient distinct readers used to detect the tag, then at step 1408 the tag tracking system may consider the tag present. On the other hand, if at step 1410 the tag tracking system determines that sufficient distinct readers have been used to detect the tag, then at step 1412 the tag tracking system may consider the tag absent.

Figure 15:
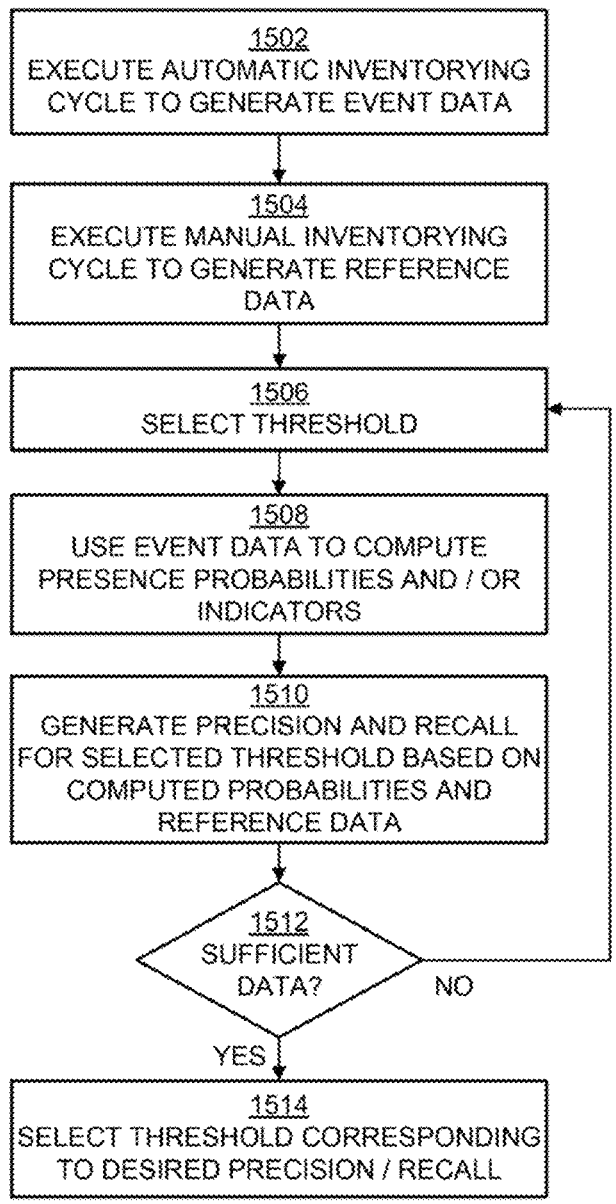
FIG. 15 is a flowchart of a training process for RFID tag presence detection.

FIG. 15 is a flowchart of a training process 1500 for RFID tag presence detection. Training process 1500 may be used to determine one or more of the thresholds described above (e.g., the total trial count N, a tag presence threshold, a tag presence probability threshold, a tag absence probability threshold, a consecutive-failure probability threshold, and/or a consecutive-failed-trial threshold). Training process 1500 may be performed by a tag tracking system, by a training system for the tag tracking system, and/or by a user of the tag tracking or training systems.

Training process 1500 begins at step 1502, where a tag tracking system executes an automatic inventorying cycle on one or more tags to generate and collect data about tag read events. For example, the tag tracking system may attempt to detect identifiers from the tags during one or more trials, as described above.

At step 1504, a manual inventorying cycle may be performed to generate reference data that identifies the actual tags that are present. The manual inventorying cycle may be performed by personnel manually inventorying the tags (that is, physically verifying tag/item presence), personnel with handheld RFID readers, another tag inventorying system, or a combination.

At step 1506, the training system may select values for one or more of the thresholds to be determined. The training system may select the values randomly, based on previous threshold values, or in a predetermined manner. At step 1508, the tag tracking system or training system may use the event data collected at step 1502 to compute tag observabilities, presence parameters, and presence indicators for the tags as described above in processes 1200, 1300, and 1400, using the threshold value(s) selected in step 1506.

At step 1510, the training system generates one or more performance parameters associated with the selected threshold values. In some embodiments, the performance parameters may indicate how completely and correctly the tag observabilities, presence parameters, and indicators computed in step 1508 using the threshold values selected in step 1506 represent the actual tags present, as indicated by the reference data. For example, the training system may generate at least a success rate and a failure rate in correctly estimating that an item is in a zone using the selected threshold values. The success rate may indicate the performance of the selected threshold values with respect to identifying tags that are actually absent, and the failure rate may indicate the performance of the selected threshold values with respect to incorrectly determining that present tags are absent or absent tags are present. In one embodiment, the success rate may include a "precision" performance parameter that represents the ratio of the number of tags determined to be absent and actually absent to the number of tags actually absent. For example, if the tag tracking system determines that 90 tags are absent from a population of 110 tags and 100 tags in the population are actually absent, the precision for the threshold value(s) used in the tag presence determination may be 90/100. The failure rate may include a "recall" performance parameter that represents the ratio of the number of tags determined to be absent and actually absent to the total number of tags determined to be absent. For example, if the tag tracking system determines that 90 tags are absent from a population of 100 tags but 80 of the "determined absent" tags are actually absent, the recall for the threshold value(s) used in the tag presence determination may be 80/90. In other embodiments, other success or failure rates may be generated and used.

Subsequently, at step 1512 the training system may determine whether it has sufficient data to select appropriate threshold values. For example, the training system may determine whether it has sufficient data based on the performance parameters, the size of the collected data set, or any other suitable data. If not, the training system may return to step 1506 and select other threshold value(s) for testing. Upon returning to step 1506, the training system may vary one, some, or all of the relevant threshold values from their previous values.

On the other hand, if the training system determines at step 1512 that it has sufficient data to select appropriate threshold values, then at step 1514 the training system may select appropriate threshold values based on desired precision, recall, and/or other performance parameters.

While the above processes are described in the context of determining tag or item presence within a zone, in other embodiments the same processes may be used to determine tag presence within multiple zones. For example, observations and events from multiple readers and antennas (e.g., those described in FIG. 9) may be combined and used to determine tag presence within a multi-zone space (e.g., the space 902). In some embodiments, observations from different readers or antennas may be treated as independent but originating from a single observer for the purposes of tag observability and probability determination.

In some embodiments, the processes described herein for determining tag presence within a zone may be combined with one or more other processes for determining tag parameters. For example, tag presence detection may be used to determine tag movement. Upon determining that a tag is no longer present in a zone but is now present in another zone, a tag tracking system may determine a tag movement distance, rate, direction, and/or tag location from the presence data and other tag parameters, such as angle-of-arrival parameters associated with a tag response, described in co-pending and commonly-owned U.S. Pat. No. 9,881,473 issued on Jan. 30, 2018, or tag read counts, described in co-pending and commonly-owned U.S. Pat. No. 9,373,012 issued on Jun. 21, 2016. Both patents referenced above are hereby incorporated by reference in their entirety.

In some embodiments, tag presence detection may be used to assist in electronic article surveillance (EAS) and/or loss-prevention, as described in the above application and in co-pending and commonly-owned U.S. Pat. No. 9,691,243 issued on Jun. 27, 2017, hereby incorporated by reference in its entirety. For example, a tag tracking system, upon determining that a previously-present tag is absent, may determine whether the tag is authorized to be absent based on, e.g., a database lookup or an exit code associated with the tag, and if not may perform a suitable security action, such as initiating an alarm or similar.

Tag presence detection may be augmented using particular tag or reader system features. For example, a tag tracking system, upon determining that a previously-present tag is now absent, may use sympathetic/cooperative powering or beam scanning pattern adjustment to attempt to re-detect the tag, as described in U.S. Pat. No. 9,373,012 referenced above. For example, the tag tracking system may attempt to increase the power available for the tag using sympathetic powering, or may adjust a beam scanning pattern (e.g., associated with a synthesized-beam reader system) to provide more time for the tag to respond.

Other techniques may be used to enhance or adjust the tag presence determination processes described herein. In some embodiments, additional signals may be incorporated into the determination of the tag detection probability θ, tag presence probabilities, tag replenishment rates, and/or appropriate threshold values. For example, the average received power at a reader antenna, an average received signal strength indicator or RSSI, a variance in the received power or the RSSI, a detected Doppler shift, the movement (average or instantaneous) of tags into and out of a zone corresponding to a reader antenna, a tag or item mobility rate (e.g., how quickly and/or frequently individual tags or items move between zones or within a zone, in an average or instantaneous sense), a prior distribution of tags in the zone corresponding to an antenna, tag population or item population density (e.g., the number of tags or items within a zone or a particular volume), an observation of a particular tag in a different zone, a physical attribute of a tag or item (e.g., its manufacturer, its material, its RF characteristics, its antenna type, its shape, etc.), an attribute of the zone environment (e.g., zone size, RF noise, RF obstructions, physical configuration, traffic, etc.), an attribute of the reader (e.g., communication channel frequency, number of readers, etc.) and/or any other suitable signal may be used for determining θ, tag presence probabilities, tag replenishment rates, and/or threshold values. In some embodiments, a probability function, such as a tag observability probability function, a tag presence probability function, or a tag absence probability function, may be a function of one or more of the signals referenced above.

In other embodiments, other mathematical optimization techniques may be used to determine the tag detection probability θ, tag presence probabilities, and/or appropriate threshold values. For example, one or more optimization algorithms, iterative methods, heuristic algorithms, and similar techniques may be used. Such techniques may include evolutionary algorithms, memetic algorithms, swarm algorithms, simulated annealing, and other techniques as known to one of ordinary skill in the art.

In some embodiments, a supervised learning framework such as a neural network, a support vector machine, or similar may be used to determine tag presence and absence. In these embodiments, the framework may determine tag presence or absence from inputs without assuming a parametric model. The inputs used may include a Bernoulli trial probability (e.g., θ), a replenishment rate (e.g., α), an average RSSI, a variance in the RSSI, a tag or item density, a communication channel frequency, a detected Doppler shift, a tag or item mobility rate, a reader count, or any other suitable input or signal, such as the additional signals described above. In other embodiments, other heuristic techniques, supervised learning techniques, unsupervised learning techniques, or machine learning techniques as known to one of ordinary skill in the art may be used to determine tag presence or absence, based on the inputs described above or any other input as appropriate.

While presence estimation techniques are described above in the context of relatively long-range RFID tags, in other embodiments the same techniques may be used to estimate presence and absence for other signal emitters. For example, an item tracking system may be configured to determine observabilities and estimate presences for near-field tags, devices (e.g., smartphones, cellular phones, laptops, etc.) that emit wireless signals (e.g., Bluetooth, Wi-Fi, etc.), or any other suitable radiation-emitting device.

The operations described in processes 1200, 1300, 1400, and 1500 are for illustrative purposes only. These operations may be implemented using additional or fewer operations and in different orders using the principles described herein.

As mentioned previously, embodiments are directed to locating RFID tags using statistical methods. Embodiments additionally include programs, and methods of operation of the programs. A program is generally defined as a group of steps or operations leading to a desired result, due to the nature of the elements in the steps and their sequence. A program may be implemented as a sequence of steps or operations for a processor, but may be implemented in other processing elements such as FPGAs, DSPs, or other devices as described above.

Performing the steps, instructions, or operations of a program requires manipulating physical quantities. Usually, though not necessarily, these quantities may be transferred, combined, compared, and otherwise manipulated or processed according to the steps or instructions, and they may also be stored in a computer-readable medium. These quantities include, for example, electrical, magnetic, and electromagnetic charges or particles, states of matter, and in the more general case can include the states of any physical devices or elements. It is convenient at times, principally for reasons of common usage, to refer to information represented by the states of these quantities as bits, data bits, samples, values, symbols, characters, terms, numbers, or the like. It should be borne in mind, however, that all of these and similar terms are associated with the appropriate physical quantities, and that these terms are merely convenient labels applied to these physical quantities, individually or in groups.

Embodiments furthermore include storage media. Such media, individually or in combination with others, have stored thereon instructions, data, keys, signatures, and other data of a program made according to the embodiments. A storage medium according to the embodiments is a computer-readable medium, such as a memory, and is read by a processor of the type mentioned above. If a memory, it can be implemented in any of the ways and using any of the technologies described above.

Even though it is said that the program may be stored in a computer-readable medium, it should be clear to a person skilled in the art that it need not be a single memory, or even a single machine. Various portions, modules or features of it may reside in separate memories, or even separate machines. The separate machines may be connected directly, or through a network such as a local access network (LAN) or a global network such as the Internet.

Often, for the sake of convenience only, it is desirable to implement and describe a program as software. The software can be unitary, or thought of in terms of various interconnected distinct software modules.

The foregoing detailed description has set forth various embodiments of the devices and/or processes via the use of block diagrams and/or examples. Insofar as such block diagrams and/or examples contain one or more functions and/or aspects, it will be understood by those within the art that each function and/or aspect within such block diagrams or examples may be implemented individually and/or collectively, by a wide range of hardware, software, firmware, or virtually any combination thereof. Those skilled in the art will recognize that some aspects of the RFID embodiments disclosed herein, in whole or in part, may be equivalently implemented employing integrated circuits, as one or more computer programs running on one or more computers (e.g., as one or more programs running on one or more computer systems), as one or more programs running on one or more processors (e.g. as one or more programs running on one or more microprocessors), as firmware, or as virtually any combination thereof, and that designing the circuitry and/or writing the code for the software and or firmware would be well within the skill of one of skill in the art in light of this disclosure. The present disclosure is not to be limited in terms of the particular embodiments described in this application, which are intended as illustrations of various aspects. Many modifications and variations can be made without departing from its spirit and scope, as will be apparent to those skilled in the art. Functionally equivalent methods and apparatuses within the scope of the disclosure, in addition to those enumerated herein, will be apparent to those skilled in the art from the foregoing descriptions. Such modifications and variations are intended to fall within the scope of the appended claims. The present disclosure is to be limited only by the terms of the appended claims, along with the full scope of equivalents to which such claims are entitled. It is to be understood that this disclosure is not limited to particular methods, configurations, antennas, transmission lines, and the like, which can, of course, vary. It is also to be understood that the terminology used herein is for the purpose of describing particular embodiments only, and is not intended to be limiting.

With respect to the use of substantially any plural and/or singular terms herein, those having skill in the art can translate from the plural to the singular and/or from the singular to the plural as is appropriate to the context and/or application. The various singular/plural permutations may be expressly set forth herein for sake of clarity.

It will be understood by those within the art that, in general, terms used herein, and especially in the appended claims (e.g., bodies of the appended claims) are generally intended as "open" terms (e.g., the term "including" should be interpreted as "including but not limited to," the term "having" should be interpreted as "having at least," the term "includes" should be interpreted as "includes but is not limited to," etc.). It will be further understood by those within the art that if a specific number of an introduced claim recitation is intended, such an intent will be explicitly recited in the claim, and in the absence of such recitation no such intent is present. For example, as an aid to understanding, the following appended claims may contain usage of the introductory phrases "at least one" and "one or more" to introduce claim recitations. However, the use of such phrases should not be construed to imply that the introduction of a claim recitation by the indefinite articles "a" or "an" limits any particular claim containing such introduced claim recitation to embodiments containing only one such recitation, even when the same claim includes the introductory phrases "one or more" or "at least one" and indefinite articles such as "a" or "an" (e.g., "a" and/or "an" should be interpreted to mean "at least one" or "one or more"); the same holds true for the use of definite articles used to introduce claim recitations. In addition, even if a specific number of an introduced claim recitation is explicitly recited, those skilled in the art will recognize that such recitation should be interpreted to mean at least the recited number (e.g., the bare recitation of "two recitations," without other modifiers, means at least two recitations, or two or more recitations).

Furthermore, in those instances where a convention analogous to "at least one of A, B, and C, etc." is used, in general such a construction is intended in the sense one having skill in the art would understand the convention (e.g., "a system having at least one of A, B, and C" would include but not be limited to systems that have A alone, B alone, C alone, A and B together, A and C together, B and C together, and/or A, B, and C together, etc.). It will be further understood by those within the art that virtually any disjunctive word and/or phrase presenting two or more alternative terms, whether in the description, claims, or drawings, should be understood to contemplate the possibilities of including one of the terms, either of the terms, or both terms. For example, the phrase "A or B" will be understood to include the possibilities of "A" or "B" or "A and B."

As will be understood by one skilled in the art, for any and all purposes, such as in terms of providing a written description, all ranges disclosed herein also encompass any and all possible subranges and combinations of subranges thereof. Any listed range can be easily recognized as sufficiently describing and enabling the same range being broken down into at least equal halves, thirds, quarters, fifths, tenths, etc. As a non-limiting example, each range discussed herein can be readily broken down into a lower third, middle third and upper third, etc. As will also be understood by one skilled in the art all language such as "up to," "at least," "greater than," "less than," and the like include the number recited and refer to ranges which can be subsequently broken down into subranges as discussed above. Finally, as will be understood by one skilled in the art, a range includes each individual member. Thus, for example, a group having 1-3 cells refers to groups having 1, 2, or 3 cells. Similarly, a group having 1-5 cells refers to groups having 1, 2, 3, 4, or 5 cells, and so forth.

We claim:

1. A method for a system that includes at least a Radio Frequency Identification (RFID) reader system and a processor block to estimate whether an item is in a zone, the method comprising:
    in at least one initial trial, the RFID reader system receiving an identifier from the item in the zone;
    the processor block determining, based on at least the identifier received in the at least one initial trial, an observability of the item in the zone;
    in a first subsequent trial, the RFID reader system attempting to receive the identifier from the item in the zone; and
    upon the RFID reader system failing to receive the identifier in the first subsequent trial, the processor block determining a presence probability of the item in the zone based on the observability and the failure of the first subsequent trial.

2. The method of claim 1, further comprising the processor block computing a tag probability of detection based on at least the received identifier, and wherein determining the observability comprises the processor block determining the observability based on the computed tag probability of detection.

3. The method of claim 2, wherein the tag probability of detection is based on at least one of a time-based read rate of the item and a cycle-based read rate of the item.

4. The method of claim 1, further comprising the processor block determining the presence probability based on at least one of a presence probability function, an absence probability function, and a consecutive-failure probability function.

5. The method of claim 1, further comprising the processor block determining the presence probability based on at least one of:
    a Bernoulli trial technique;
    a Bayesian technique; and
    a maximum likelihood estimator technique.

6. The method of claim 1, further comprising the processor block comparing the presence probability to a presence threshold to estimate whether the item is in the zone.

7. The method of claim 6, further comprising the processor block determining the presence threshold based on at least one of:
  a success rate in correctly estimating the item is in the zone; and
  a failure rate in correctly estimating the item is in the zone.

8. The method of claim 6, further comprising the processor block determining at least one of the observability, the presence probability, and the presence threshold based on at least one of:
  a physical attribute of the item;
  an observation of the item in another zone;
  an item replenishment rate,
  a transmitting frequency,
  an average strength of a signal received from the item,
  a variance in the strength of the signal received from the item,
  a Doppler shift in a frequency of the signal received from the item,
  an item density,
  an item mobility rate, and
  a number of receivers receiving the signal from the item.

9. The method of claim 6, further comprising:
  in a second subsequent trial, the RFID reader system attempting to receive the identifier from the item in the zone;
  and
  in response to the RFID reader system receiving the identifier in the second subsequent trial, the processor block:
    adjusting the observability of the item in the zone; and
    indicating the item is still in the zone.

10. A system configured to estimate the presence of an item in a zone, the system comprising:
  a reader system configured to:
    in at least one initial trial, receive an identifier from the item in the zone; and
    in a first subsequent trial:
      attempt to receive the identifier from within the zone; and
      fail to receive the identifier; and
  a processor block configured to:
    determine, based on the at least one initial trial, an observability of the item in the zone; and
    in response to the reader system failing to receive the identifier in the first subsequent trial, determine a presence probability of the item in the zone based on the observability and the failure of the first subsequent trial.

11. The system of claim 10, wherein the processor block is further configured to:
  compute a tag probability of detection based on at least the received identifier, and
  determine the observability based on the computed tag probability of detection.

12. The system of claim 11, wherein the processor block is configured to compute the tag probability of detection based on at least one of a time-based read rate of the item and a cycle-based read rate of the item.

13. The system of claim 10, wherein the processor block is further configured to determine the presence probability based on at least one of a presence probability function, an absence probability function, and a consecutive-failure probability function.

14. The system of claim 10, wherein the processor block is further configured to determine the presence probability based on at least one of:
  a Bernoulli trial technique;
  a Bayesian technique; and
  a maximum likelihood estimator technique.

15. The system of claim 10, wherein the processor block is further configured to compare the presence probability to a presence threshold to estimate whether the item is in the zone.

16. The system of claim 15, wherein the processor block is further configured to determine the presence threshold based on at least one of:
  a success rate in correctly estimating the item is in the zone; and
  a failure rate in correctly estimating the item is in the zone.

17. The system of claim 15, wherein the processor block is further configured to determine at least one of the observability, the presence probability, and the presence threshold based on at least one of:
  a physical attribute of the item;
  an observation of the item in another zone;
  an item replenishment rate,
  a transmitting frequency,
  an average strength of a signal received from the item,
  a variance in the strength of the signal received from the item,
  a Doppler shift in a frequency of the signal received from the item,
  an item density,
  an item mobility rate, and
  a number of receivers receiving the signal from the item.

18. The system of claim 15, wherein:
  the reader system is further configured to:
    in a second subsequent trial, attempt to receive the identifier from the item in the zone; and
    receive the identifier in the second subsequent trial; and
  the processor block is further configured to, in response to receiving the identifier in the second subsequent trial:
    adjust the observability of the item in the zone; and
    indicate the item is still in the zone.

19. A system configured to estimate the presence of an item, the system comprising:
  a synthesized-beam reader (SBR) system configured to:
    generate a first beam corresponding to a first zone;
    in at least one initial trial, receive an identifier for the item on the first beam; and
    in a first subsequent trial:
      attempt to receive the identifier on the first beam; and
      fail to receive the identifier; and
  a processor block configured to:
    determine, based on the at least one initial trial, an observability of the item;
    in response to the reader system failing to receive the identifier in the first subsequent trial, determine a presence probability of the item based on the observability and the failure of the first subsequent trial; and
    estimate, based on the presence probability and a presence threshold, whether the item is still in the first zone.

20. The system of claim 19, wherein:
  the SBR system is further configured to:

generate a second beam corresponding to a second zone;

in the at least one initial trial and the at least one subsequent trial, attempt to receive the identifier on the second beam; and the processor block is further configured to estimate whether the item is still in at least one of the first and second zones based on the observability, the presence probability, and the observability threshold.

* * * * *

UNITED STATES PATENT AND TRADEMARK OFFICE
CERTIFICATE OF CORRECTION

PATENT NO. : 10,572,703 B1
APPLICATION NO. : 15/959601
DATED : February 25, 2020
INVENTOR(S) : Balaji Shyamkumar et al.

Page 1 of 1

It is certified that error appears in the above-identified patent and that said Letters Patent is hereby corrected as shown below:

In the Specification

In Column 15, Line 25 (Approx.), Delete "a," and insert -- α, --, therefor.
In Column 15, Line 26 (Approx.), Delete "a" and insert -- α --, therefor.
In Column 15, Line 32 (Approx.), Delete "P(e=0)=P(a=0)P" and insert -- p(e=0)=p(a=0)p --, therefor.
In Column 15, Line 33 (Approx.), Delete "a," and insert -- α, --, therefor.
In Column 16, Line 29 (Approx.), Delete "p(M N, K)," and insert -- p(M|N, K), --, therefor.
In Column 27, Line 3, Delete "and or" and insert -- and/or --, therefor.

Signed and Sealed this
Fourth Day of August, 2020

Andrei Iancu
*Director of the United States Patent and Trademark Office*